United States Patent
Sobh et al.

(10) Patent No.: US 10,698,711 B2
(45) Date of Patent: Jun. 30, 2020

(54) CLOUD COMPUTING SYSTEMS

(71) Applicant: The American University in Cairo, Cairo (EG)

(72) Inventors: Karim Mohamed Sobh, Giza (EG); Amr Ahmed El-Kadi, Cairo (EG)

(73) Assignee: THE AMERICAN UNIVERSITY IN CAIRO, Cairo (EG)

( * ) Notice: Subject to any disclaimer, the term of this patent is extended or adjusted under 35 U.S.C. 154(b) by 214 days.

(21) Appl. No.: 15/088,476

(22) Filed: Apr. 1, 2016

(65) Prior Publication Data
US 2017/0005813 A1    Jan. 5, 2017

Related U.S. Application Data

(60) Provisional application No. 62/187,607, filed on Jul. 1, 2015.

(51) Int. Cl.
*G06F 9/455* (2018.01)
*H04L 29/08* (2006.01)
(Continued)

(52) U.S. Cl.
CPC ...... *G06F 9/45558* (2013.01); *H04L 41/0266* (2013.01); *H04L 67/10* (2013.01);
(Continued)

(58) Field of Classification Search
CPC ............ G06F 9/45533; G06F 9/45541; G06F 9/4558; G06F 2009/45595; G06F 9/45558;
(Continued)

(56) References Cited

U.S. PATENT DOCUMENTS

2005/0039180 A1* 2/2005 Fultheim ............... G06F 9/4411
718/1
2013/0322264 A1* 12/2013 Campbell ............... G06F 13/24
370/245
(Continued)

OTHER PUBLICATIONS

VMware ESXi esxcli Command: A Quick Tutorial, May 12, 2015, DoubleCloud, all pages, http://www.doublecloud.org/2015/05/vmware-esxi-esxcli-command-a-quick-tutorial/[Mar. 14, 2018 8:50:43 AM].*

(Continued)

*Primary Examiner* — Thomas J Dailey
*Assistant Examiner* — Lam H Duong
(74) *Attorney, Agent, or Firm* — Jenkins, Wilson, Taylor & Hunt, P.A.

(57) ABSTRACT

A multi-tier cloud-metering framework for metering cloud resources is presented. The proposed framework is capable of relating metering indicator of distributed resources contributing to the same application and located at different architectural levels. Metering data is collected from the front-end, the cloud nodes and VMs, and propagated through the middle-tier of the metering architecture to be processed and stored at the back-end. The design of the metering framework adopts a service-oriented architecture which allow the processing of cloud metering objects CMOs using service processing over open web transport protocol. To be able to build the middle and back-end tier, a SOA based on IPIoE and BOSML is presented which allow full consolidation of cloud resources achieving scalability and reducing the amount of wasted resources due to cloud resources de-fragmentation.

18 Claims, 14 Drawing Sheets

(51) Int. Cl.
  H04L 12/24    (2006.01)
  H04L 12/14    (2006.01)
  H04L 12/26    (2006.01)
  H04M 15/00    (2006.01)
  G06Q 20/14    (2012.01)
(52) U.S. Cl.
  CPC .  G06F 2009/45591 (2013.01); G06Q 20/145
          (2013.01); H04L 12/1403 (2013.01); H04L
          12/1432 (2013.01); H04L 41/5009 (2013.01);
            H04L 41/5029 (2013.01); H04L 41/5096
            (2013.01); H04L 43/08 (2013.01); H04M
                                    15/66 (2013.01)
(58) Field of Classification Search
  CPC ........... G06F 9/452; G06F 2009/45591; H04L
            12/1432; H04L 12/1403; H04L 12/1485;
              H04L 43/08; H04L 41/5096; H04L
              41/5009; H04L 67/10; H04L 41/0266;
              H04L 41/5029; H04M 15/66; H04M
              17/00; H04M 17/02; G06Q 20/145
  USPC ....................................................... 709/223
  See application file for complete search history.

(56)                References Cited

U.S. PATENT DOCUMENTS

2015/0081881 A1    3/2015  Eaton
  2015/0081882 A1    3/2015  Bartucca et al.
  2015/0081883 A1    3/2015  Katz et al.
  2015/0082432 A1    3/2015  Eaton et al.
  2016/0147556 A1*   5/2016  Hu ...................... G06F 9/45558
                                                          718/1

OTHER PUBLICATIONS

"3.2 Big-Step Structural Operational Semantics (Big-Step SOS)," Formal Systems Laboratory, Department of Computer Science, University of Illinois at Urbana-Champaign, PL Book BigStep, CS522, pp. 87-108 (Spring 2011).
"3.3 Small-Step Structural Operational Semantics (Small-Step SOS)," Formal Systems Laboratory, Department of Computer Science, University of Illinois at Urbana-Champaign, PL Book SmallStep, CS522, pp. 102-118 (Spring 2011).
"Cloud Adoption Study: Cloud computing is gaining momentum," Deloitte Consulting with CIOnet, Deloitte, 1831 Diegem, Belgium, pp. 1-12 (Oct. 2011).
"Cloud Computing Research," Cloud Computing Research, PDS Group, TU Delft, pp. 1-4 (Last Modified: Jan. 27, 2010).
"Enterprise manager 12c cloud control metering and chargeback," An Oracle White Paper, Oracle Enterprise Manager 12c, Oracle, pp. 1-29 (Apr. 2012).
Kishkani, "How to Modify Eucalyptus Source Code," https://www.scribd.com/document/47652415/HOW-TO-MODIFY-EUCALYPTUS-SOURCE-CODE, pp. 1-7 (Publication Date Unknown).
"Intro to semantics; Small-step semantics," Harvard School of Engineering and Applied Sciences—Computer Science 152, Lecture 1, pp. 1-5 (Jan. 26, 2010).
"Operational Semantics for While," Models of Computation, pp. 1-27 (2010).
"Oracle Cloud Management Pack for Oracle Database," Data Sheet, Oracle Enterprise Manager, pp. 1-4 (2011).
"Saas Billing & Metering," White Paper, Progress Software Corporation, pp. 1-10 (2008).
"Server virtualization technologies for x86-based HP BladeSystem and HP ProLiant servers," Technology brief, 3rd Edition, Hewlett-Packard Development Company, pp. 1-21 (2009).
"The Open Group Cloud Computing Survey," The Open Group, pp. 1-16 (May 9, 2011).
"Understanding full virtualization, paravirtualization, and hardware assist," White Paper, vmware®, pp. 1-17 (2007).
"Universal PMML Plug-in for EMC Greenplum Database: Delivering massively parallel predictions," Zementis Adaptive Decision Technology, Zementis, Inc., pp. 1-7 (2011).
"VBLOCK™ Infrastructure Platforms—Guidelines for metering and chargeback using VMWare VCenter chargeback," IaaS COE, White Paper, The Virtual Computing Environment Company, pp. 1-22 (Jan. 2011).
"XML Generation," Chapter 1, pp. 1-18 (Publication Date Unknown).
Adams et al., "A comparison of software and hardware techniques for x86 virtualization," SIGARCH Comput. Archit. News, vol. 34, No. 5, pp. 2-13 (Oct. 2006).
Agarwal et al., "Metering and accounting for composite e-services," Proceedings of the IEEE International Conference on E-Commerce (CEC '03), IEEE Computer Society, pp. 1-5 (2003).
Aldham et al., "Low-cost hardware profiling of run-time and energy in FPGA embedded processors," pp. 1-8 (Publication Date Unknown).
Aldrich, "Hoare Logic: Proving Programs Correct," Analysis of Software Artifacts, slides 3-46 (2006).
Amazon AWS Website. Amazon cloudwatch product details. https://aws.amazon.com/cloudwatch/details/, pp. 1-6 (Online; accessed Feb. 11, 2016).
Amazon AWS Website. Amazon cloudwatch: Publish custom metrics. http://docs.aws.amazon.com/AmazonCloudWatch/latest/DeveloperGuide/publishingMetrics.html, pp. 1-3 (Online; accessed Feb. 11, 2016).
Amornchewin, "Probability-based incremental association rules discovery algorithm with hashing technique," International Journal of Machine Learning and Computing, vol. 1, No. 1, pp. 43-48 (Apr. 2011).
Anderson et al., "Continuous Profiling: Where have all the cycles gone?," ACM Trans. Comput. Syst., vol. 15, No. 4, pp. 357-390 (1997).
Anderson, "Anderson-Darling Tests of Goodness-of-Fit," Stanford University, pp. 1-7 (Feb. 18, 2010).
Anderson, "Time and synchronization," Lecture 9, Computer Science Department, Carnegie Mellon Univerity, https://www.cs.cmu.edu/~dga/15-440/F11/lectures/09-time+synch.pdf, slides 1-21 (Aug. 2012).
Angin et al., "An Entity-centric Approach for Privacy and Identity Managemnent in Cloud Computing," 29th IEEE International Symposium on Reliable Distributed Systems, IEEE Computer Society, pp. 177-183 (2010).
Anwar et al., "Cost-aware cloud metering with scalable service management infrastructure," 2015 IEEE 8th International Conference on Cloud Computing (CLOUD), pp. 285-292 (Jun. 2015).
Anwar et al., "Scalable metering for an affordable IT cloud service management," 2015 IEEE International Conference on Cloud Engineering (IC2E), pp. 207-212 (Mar. 2015).
Apache. ab: Apache http server benchmarking tool. https://httpd.apache.org/docs/2.2/programs/ab.html, 2012 (Online; accessed Feb. 15, 2016).
Apache. Apache HTTP Server Project. http://httpd.apache.org/, 2015. (Online; accessed Dec. 12, 2015).
Apache. Hadoop Streaming. http://hadoop.apaphe.org/common/docs/r0.15.2/streaming.html#Hadoop+Streaming, 2012 (Online; accessed Mar. 29, 2012).
Apache. Hadoop. http://hadoop.apache.org/, 2012 (Online; accessed Mar. 29, 2012).
Apt, "Ten years of Hoare's logic: A survey part I," ACM Transactions on Programming Languages and Systems (TOPLAS), vol. 3, No. 4, pp. 431-483 (1981).
Apte et al., "Look who's talking: Discovering dependencies between virtual machines using CPU utilization," pp. 1-7 (Publication Date Unknown).
Armbrust et al., "A view of cloud computing," Communications of the ACM, vol. 53, No. 4, pp. 50-58 (Apr. 2010).
Armbrust et al., "Above the clouds: A Berkeley view of cloud computing," Technical Report UCB/EECS-2009-28, EECS Department, University of California, Berkeley (Feb. 2009).

(56) References Cited

OTHER PUBLICATIONS

Arora, "A comparative study on temporal database models: A survey," 2015 International Sympoisum on Advanced Computing and Communication (ISACC), pp. 161-167 (Sep. 2015).
Aseervatham et al., "The PMML Interpreter, " Internship Report, KXEN Knowledge Extraction Engines, Universite Paris 13 Institut Galilee, pp. 1-60 (Apr.-Sep. 2002).
Asha et al., "A survey on efficient incremental algorithm for mining high utility itemsets in distributed and dynamic database," International Journal of Emerging Technology and Advanced Engineering, vol. 4, Issue 1, pp. 146-149 (Jan. 2014).
Attali et al., "A formal executable semantics for Java," pp. 1-13 (Publication Date Unknown).
Augustus: Modeling Primer, Release 0.5.0.0, Open Data Group, pp. 1-26 (Dec. 19, 2011).
Ayad et al., "Incremental mining of constrained association rules," pp. 1-18 (Publication Date Unknown).
Baragoin et al., "Enhance Your Business Applications: Simple integration of advanced data mining functions," Redbooks, IBM International Technical Support Organization, IBM Corp, DB2 Data Management Software, pp. 1-318 (Dec. 2002).
Barmouta et al., "Gridbank: A grid accounting services architecture (GASA) for distributed systems sharing and integration," Proceedings of the 17th Annual International Parallel and Distributed Processing Symposium (IPDPS 2003), IEEE Computer, Society Press, pp. 22-26 (2003).
BaseX Website. BaseX: The XML database. http://www.basex.org/, 2016 (Online; accessed Jan. 22, 2016).
Bauknecht et al. (Eds.), "E-Commerce and Web Technologies," 3rd International Conference, EC-Web 2002, Springer, Aix-en-Provence, France, Lecture Notes in Computer Science (LNCS) 2455 (Sep. 2002).
Beloglazov et al., "A taxonomy and survey of energy-efficient data centers and cloud computing systems," CoRR, abs/1007.0066 (2010).
Bennett et al., "MalGen V. 0.9 overview," Open Cloud Consortium (2009).
Bennett et al., "Malstone: A benchmark for data intensive computing," Open Cloud Consortium Technical Report TR-09-01(2009).
Bennett et al., "MalStone: Towards a benchmark for analytics on large data clouds," Proceedings of the 16th ACM SIGKDD International Conference on Knowledge, Discovery, and Data Mining, KDD '10, Washington, DC, USA, pp. 145-152 (2010).
Benson et al., "A first look at problems in the cloud," pp. 1-7 (Publication Date Unknown).
Berkhin, "Survey of clustering data mining techniques," Grouping Multidimensional Data, Springer Berlin Heidelberg, pp. 1-56 (2006).
Bertolino et al., "VCR: Virtual capture and replay for performance testing," Proceedings of the 2008 23rd IEEE/ACM International Conference on Automated Software Engineering, ASE '08, IEEE Computer Society, Washington, DC, USA, pp. 399-402 (2008).
Bertran et al., "Energy accounting for shared virtualized environments under DVFS using PMC-based power models," Future Generation Computer Systems, vol. 28, No. 2, pp. 457-468 (Feb. 2012).
Bhadane et al., "An efficient parallel approach for frequent itemset mining of incremental data," International Journal of Scientific & Engineering Research, vol. 3, Issue 2, pp. 1-5 (2012).
Bila et al., "The case for energy-oriented partial desktop migration," pp. 1-7 (Publication Date Unknown).
Bohra et al., "VMeter: Power modelling for virtualized clouds," 2010 IEEE International Symposium on Parallel Distributed Processing, Workshops and Phd Forum (IPDPSW), pp. 1-8 (Apr. 2010).
Bormann et al., "Third-party-initiated context-aware real-time charging and billing on an open SOA platform," 22nd International Conference on Advanced Information Networking and Applications—Workshops, IEEE Computer Society, pp. 1375-1380 (2008).
Bose et al., "Leveraging smart-meters for initiating applications migration across clouds for performance ad power-expenditure trade-offs," 2010 1st IEEE International Conference on Smart Grid Communications (SmartGridComm), pp. 102-107 (Oct. 2010).
Bouchenak et al., "Autonomic Management of Clustered Applications," pp. 1-11 (Publication Date Unknown).
Bouyer et al., "The detection of new impact parameters for price-adjusting and allocation in market-based grids," 2010 4th International Conference on New Trends in Information Science and Service Science (NISS), pp. 54-59 (May 2010).
Bouyer et al., "Using rough set based multi-checkpointing for fault-tolerance scheduling in economic grids," IEEE, pp. 321-326 (2009).
Brenna et al., "Cayuga: A high-performance event processing engine," SIGMOD '07, Beijing, China, pp. 1-4 (Jun. 11-14, 2007).
Bussieck et al., "Mixed-integer nonlinear programming," pp. 1-7 (Feb. 19, 2003).
Buyya et al., "Market-oriented cloud computing: Vision, hype, and reality for delivering IT services as computing utilities," pp. 1-9 (Publication Date Unknown).
Cardosa et al., "Exploiting Spatio-Temporal Tradeoffs for Energy Efficient MapReduce in the Cloud," Technical Report TR 10-1008, Department of Computer Science and Engineering, University of Minnesota (Apr. 2010).
CCGrid 2010 Table of Contents, 2010 10th IEEE/ACM International Conference on Cluster, Cloud and Grid Computing, pp. v-xv (2010).
Cesa-Bianchi et al., "Incremental Algorithms for Hierarchical Classification," pp. 1-8 (Publication Date Unknown).
Chang et al., "Bigtable: A distributed storage system for structured data," Proceedings of the 7th Conference on USENIX Symposium on Operating Systems, Design and Implementation, vol. 7, pp. 205-218 (2006).
Charguéraud, "Pretty-big-step semantics," pp. 1-20 (Publication Date Unknown).
Chaudhuri et al., "A modified physical clock synchronization algorithm," 2013 3rd IEEE International Advance Computing Conference (IACC), pp. 34-39 (2013).
Chaves et al., "Augustus: The Design and Architecture of a PMML-Based Scoring Engine," Fourth Workshop on Data Mining Standards, Services and Platforms (DM-SSP '06), Philadelphia, Pennsylvania, USA (Aug. 20, 2006).
Chen et al., "A novel hardware assisted full virtualization technique," The 9th International International Conference for Young Computer Scientists, ICYCS 2008, pp. 1292-1297 (Nov. 2008).
Chen et al., "Checkpoint interval and system's overall quality for message logging-based rollback and recovery in distributed and embedded computing," International Conference on Embedded Software and Systems, ICESS '09, pp. 315-322 (May 2009).
Chiu et al., "Elastic cloud caches for accelerating service-oriented computations," IEEE SC '10, New Orleans, Louisiana, USA, pp. 1-11 (Nov. 2010).
Chohan et al., "See Spot Run: Using spot instances for MapReduce workflows," pp. 1-7 (Publication Date Unknown).
Chongchong et al., "The application of PMML in healthy housing evaluation and rules discovery decision support system," 2008 International Conference on Computer Science and Software Engineering, vol. 4, pp. 459-465 (Dec. 2008).
Chun et al., "Market-based proportional resource sharing for clusters," Technical report, University of California at Berkeley, pp. 1-19 (1999).
Chung et al., "Dynamic pattern mining: An incremental data clustering approach," Journal on Data Semantics II, vol. 3360 of Lecture Notes in Computer Science, Springer Berlin Heidelberg, pp. 85-112 (2005).
Chuvakin et al., "Common Event Expression," Stanford Whitehouse, LogLogic, Revision 1.0, pp. 1-18 (Mar. 19, 2017).
Ciobaca, "From Small-step Semantics to Big-step Semantics, Automatically," pp. 1-15 (Publication Date Unknown).
Cloudscaling.com, "Infrastructure-as-a-Service Builder's Guide," v1.0.2—Q4 2009, pp. 1-14 (2009).
Cookies 'n More Store. Cookies 'n more website. http://www.cookiesnmorestore.com/, 2004 (Online; accessed Feb. 2, 2016).
Corbet et al., Linux Device Drivers, 3rd Edition, O'Reilly Media, Inc. (2005).
Cormen et al., Introduction to algorithms, 2nd Edition, The MIT Press, Cambridge, Massachusetts (2001).

(56) References Cited

OTHER PUBLICATIONS

Craciunas et al., "Information-Acquisition-as-a-Service for Cyber-Physical Cloud Computing," pp. 1-6 (Publication Date Unknown).
Cunsolo et al., "Applying software engineering principles for designing Cloud@Home," 10th IEEE/ACM International Conference on Cluster, Cloud and Grid Computing, pp. 618-624 (2010).
CURL Website. cURL. https://curl.haxx.se/, 2016 (Online; accessed Feb. 3, 2016).
Das et al., "Massively parallel in-database predictions using PMML," Proceedings of the 2011 workshop on Predictive markup language modeling, PMML '11, New York, YN, USA, pp. 22-27 (2011).
De Melo, "Performance Counters on Linux the New Tools," Linux Plumbers Conference, slides 1-47 (Sep. 2009).
Dean et al., "MapReduce: Simplified data processing on large clusters," USENIX Association 6th Symposium on Operating Systems Design and Implementation, OSDI '04, pp. 137-149 (2004).
Denatious et al., "Survey on data mining techniques to enhance intrusion detection," 2012 International Conference on Computer Communication and Informatics (ICCCI), pp. 1-5 (Jan. 2012).
Desai et al., "Eucalyptus-Based Event Correlation," GSAW 2010, Working Group Session 11D, Aerospace, Assuring Space Mission Success, slides 1-16 (Mar. 3, 2010).
Ding et al., "More convenient more overhead: The performance evaluation of hadoop streaming," Proceedings of the 2011 ACM Symposium on Research in Applied Computation, RACS '11, New York, NY, USA, pp. 307-313 (2011).
Dongarra et al., "Using PAPI for hardware performance monitoring on linux systems," Conference on Linux Clusters: The HPC Revolution, Linux Clusters Institute (2001).
Dougherty, Sed and AWK, Second Edition, O'Reilly & Associates, Inc., Sebastopol, CA, USA, 434 pages total (1997).
Du et al., "Performance profiling in a virtualized environment," pp. 1-6 (Publication Date Unknown).
Du et al., "Performance profiling of virtual machines," SIGPLAN Not., vol. 46, No. 7, pp. 3-14 (Mar. 2011).
Dukan et al., "Cloud-based smart metering system," 14th IEEE International Symposium on Computational Intelligence and Informatics (CINTI 2013), Budapest, Hungary, pp. 499-502 (Nov. 19-21, 2013).
Durrett, Probability: Theory and Examples, Edition 4.1, pp. 1-386 (Apr. 21, 2013).
Ellison, "Introduction to SGML Concepts," The Institution of Electrical Engineers, IEE, Savoy Place, London, UK, pp. 1-5 (1994).
Elmroth et al., "Accounting and billing for federated cloud infrastructures," 8th International Conference on Grid and Cooperative Computing, GCC '09, pp. 268-275 (Aug. 2009).
Engelberg, "The central limit theorem and low-pass filters," Proceedings of the 2004 11th IEEE International Conference on Electronics, Circuits and Systems, ICECS 2004, pp. 65-68 (2004).
Engelhardt et al., "Writing Netfilter modules," Revised edition, pp. 1-67 (Jul. 3, 2012).
Ester et al., "Incremental clustering for mining in a data warehousing environment," Proceedings of the 24th International Conference on Very Large Data Bases, VLDB '98, Morgan Kaufmann Publishers Inc., San Francisco, CA, USA, pp. 323-333 (1998).
Eucalyptus. Eucalyptus. https://www.eucalyptus.com/eucalyptus-cloud/iaas, 2014 (Online; accessed Nov. 16, 2014).
Everitt et al., "A Handbook of Statistical Analyses Using R," pp. 1-207 (Dec. 2005).
Fernández et al., "Using automated planning for improving data mining processes," The Knowledge Engineering Review, Cambridge University Press, vol. 00:0, pp. 1-15 (2009).
Fialho et al., "What is missing in current checkpoint interval models?," 2011 31st International Conference on Distributed Computing Systems (ICDCS), pp. 322-332 (Jun. 2011).
Fidge, "Fundamentals of distributed system observation," IEEE Software, vol. 13, No. 6 (Nov. 1996).
Field, Discovering Statistics Using SPSS: (and Sex, Drugs, and Rock'n'roll), ISM (London, England), SAGE (2005).
Fielding, Architectural styles and the design of network-based software architectures, PhD thesis, University of California, Irvine (2000).
Fill et al., "On the conceptualisation of modelling methods using the ADOxx meta modelling platform," Enterprise Modelling and Information Systems Architectures, vol. 8, No. 1, pp. 4-25 (Mar. 2013).
Fill, "On the conceptualization of a modeling language for semantic model annotation," Advanced Information Systems Engineering Workshops, Springer, pp. 134-148 (2011).
Fong et al., "Incremental learning algorithms for fast classification in data stream," 2013 International Symposium on Computational and Business Intelligence (ISCBI), pp. 186-190 (Aug. 2013).
Foster, "The Grid: A new infrastructure for 21st century science," Physics Today, American Institute of Physics, pp. 51-62 (2002).
Furia, "Software Verification Exercise class 5: Model Checking," ETH Zurich, Chair of Software Engineering, slides 1-44 (2009).
Furia, "Software Verification Exercise; Lecture 7: Model Checking," ETH Zurich, Chair of Software Engineering, slides 1-43 (2009).
Gardfjäll et al., "Scalable grid-wide capacity allocation with the swegrid accounting system (SGAS)," Concurr. Comput.: Pract. Exper., vol. 20., No. 18, pp. 2089-2122 (Dec. 2008).
Geist et al., "Selection of a checkpoint interval in a critical-task environment," IEEE Transactions on Reliability, vol. 37, No. 4, pp. 395-400 (Oct. 1988).
Gelenbe, "On the optimum checkpoint interval," J. ACM, vol. 26, No. 2, pp. 259-270 (Apr. 1979).
Gesmann et al., "Using the Google Visualization API with R," The R Journal, vol. 3, No. 2, pp. 40-44 (Dec. 2011).
Ghemawat et al., "The Google file system," SOSP '03, Bolton Landing, New York, USA (2003).
Girotra et al., "Comparative survey on association rule mining algorithms," International Journal of Computer Applications, vol. 84, No. 10, pp. 18-22 (Dec. 2013).
Glaser, "Exact critical values for Bartlett's test for homogeneity of variances," Journal of the American Statistical Association, vol. 71, No. 354, pp. 488-490 (1976).
Glencross, "A practical approach to the central limit theorem," ICOTS 2, pp. 91-95 (1986).
Globus. Globus toolkit. http://toolkit.globus.org/toolkit/, 2014 (Online; accessed Nov. 16, 2014).
Gongxing, "A study on the mining algorithm of fast association rules for the XML data," International Conference on Computer Science and Information Technology, ICCSIT '08, pp. 204-207 (Aug. 2008).
Gordon, "Background reading on Hoare Logic," pp. 1-133 (Apr. 4, 2012).
Goyal et al., "An efficient density based incremental clustering algorithm in data warehousing environment," International Conference on Computer Engineering and Application (2009).
Graham et al., "gprof: A call graph execution profiler," Computer Science Division, Electrical Engineering and Computer Science Department, University of California, Berkeley, pp. PSD:18-1—PSD:18-10 (Publication Date Unknown).
Griffis, "Performance analysis of real-time systems: real-time software performance monitoring approaches, difficulties, and analysis techniques," Technical report SP_08_SE_655, Embry-Riddle Aeronautical University (2008).
Grossman et al., "Data mining using high performance data clouds: Experimental studies using sector and sphere," Proceedings of the 14th ACM SIGKDD International Conference on Knowledge, Discovery, and Data Mining, KDD '08, New York, NY, USA, pp. 920-927 (2008).
Guazzelli et al., "Efficient deployment of predictive analytics through open standards and cloud computing," SIGKDD, Explor. Newsl., vol. 11, No. 1, pp. 32-38 (Nov. 2009).
Guazzelli et al., "PMML: An open standard for sharing models," The R Journal, vol. 1, No. 1, pp. 60-65 (2009).
Guazzelli, "Predictive analytics in healthcare: The importance of open standards," IBM developerWorks, pp. 1-10 (Nov. 29, 2011).
Guazzelli, "Representing predictive solutions in PMML: Move from raw data to predictions," IBM developerWorks, pp. 1-12 (Sep. 28, 2010).

(56) References Cited

OTHER PUBLICATIONS

Guazzelli, "What is PMML? Explore the power of predictive analytics and open standards," IBM developerWorks, pp. 1-12 (Jul. 30, 2010; Updated Sep. 28, 2010).
Gusella et al., "An Election Algorithm for a Distributed Clock Synchronization Program," Report No. UCB/CSD 86/275, PROGRES Report No. 85.17, Computer Science Division (EECS), University of California, Berkeley, California 94720, pp. 1-17 (Dec. 1985).
Gusella et al., "The accuracy of the clock synchronization achieved by TEMPO in Berkeley UNIX 4.3BSD," IEEE Transaction on Software Engineering, vol. 15, No. 7, pp. 847-854 (Jul. 1989).
Gusella et al., "The Berkeley UNIX 4.3BSD Time Synchronization Protocol—Protocol Specification," Report No. UCB/CSD 85/250, PROGRES Report No. 85.13, Computer Science Division (EECS), University of California, Berkeley, California, pp. 1-13 (Jun. 1985).
Gusella et al., "The Berkeley UNIX® Time Synchronization Protocol," Computer Systems Research Group, Computer Science Division, Department of Electrical Engineering and Computer Science, University of California, Berkeley, pp. SMM:12-1—SMM:12-10 (Publication Date Unknown).
Haban et al., "Monitoring and management-support of distributed systems,"TR-88-007, pp. 1-30 (Nov. 1988).
Hanzlik et al., "A composable algorithm for clock synchronization in multi-cluster real-time systems," (Publication Date Unknown).
Hao et al., "Secure cloud computing with a virtualized network infrastructure," pp. 1-7 (Publication Date Unknown).
HAProxy Website. Haproxy: The reliable, high performance TCP/HTTP load balancer. http://www.haproxy.org/, 2016 (Online; accessed Feb. 2, 2016).
Heinbockel et al., "Introduction to CEE v0.6," MITRE Corporation, slides 1-63 (2011).
Hennessy, "A fully abstract denotational sematics for the π-Calculus," Elsevier Preprint, pp. 1-40 (Feb. 20, 2003).
Hiller et al., "Software profiling for designing dependable software," pp. 1-8 (Publication Date Unknown).
Hilley, "Cloud computing: A taxonomy of platform and infrastructure-level offerings," Georgia Institute of Technology, pp. 1-38 (Apr. 2009).
Hipp et al., "Algorithms for association rule mining: A general survey and comparison," SIGKDD Explor. Newsl., vol. 2, No. 1, pp. 58-64 (2000).
Hoare, "An axiomatic basis for computer programming," Communications fo the ACM, vol. 12, No. 10, pp. 576-583 (Oct. 1969).
Hoefer et al., "Taxonomy of cloud computing services," Proceedings of the 4th IEEE Workshop on Enabling the Future Service-Oriented Internet (EFSOI '10), Workshop of IEEE GLOBE-COM 2010, Miami, USA, IEEE Communications Society, pp. 1345-1350 (Dec. 2010).
Hofmann, "The distributed hardware monitor ZM4 and its interface to MEMSY," pp. 1-17 (Jul. 1, 1993).
Hong et al., "On the choice of checkpoint interval using memory usage profile and adaptive time series analysis," Proceedings of the 2001 Pacific Rim International Symposium on Dependable Computing, pp. 45-48 (2001).
Huemer et al., "A stepwise approach towards an interoperable and flexible logging principle for audit trails," 2010 7th International Conference on Information Technology: New Generations (ITNG), pp. 114-119 (Apr. 2010).
Huffman, "A method for the construction of minimum-redundancy codes," Proceedings of the I.R.E., pp. 1098-1101 (Sep. 1952).
Huh et al., "Trusted Logging for grid computing," Third Asia-Pacific Trusted Infrastructure Technologies Conference, IEEE Computer Society, pp. 30-42 (2008).
Hym et al., "Adding recursion to DPI (Extended abstract)," SOS 2005 Preliminary Version, pp. 1-18 (2005).
IBM Redbooks. Integrated Management Module (IMM) Support on IBM System x and BladeCenter Servers, IBM (Jan. 2012).
IBM, "Integrated Management Module (IMM) Support on IBM System x and BladeCenter Servers," Redbooks Web Doc, pp. 1-7 (2011).
IBM, Integrated Management Module, User's Guide, IBM, 3rd Edition (Feb. 2010).
Ibrahim et al., "Comparison between (RLE and Huffman) algorithms for lossless data compression," (DITR) International Journal of Innovative Technology and Research, vol. 3, No. 1, pp. 1808-1812 (Dec.-Jan. 2015).
Ichikawa et al., "Development of data mining platform MUSASHI towards service computing," 2010 IEEE International Conference on Granular Computing (GrC), pp. 235-240 (Aug. 2010).
IEEE. IEEE Std 1003.1-2001 Standard for Information Technology—Portable Operating System Interface (POSIX) Rationale (Informative), Revision of IEEE Std 1003.1-1996 and IEEE Std 1003.2-1992 Open Group Technical Standard Base Specifications, Issue 6 (2001).
Lerusalimschy et al., "Passing a Language through the Eye of a Needle: How the embeddability of Lua impacted its design," ACMQueue, Programming Languages, pp. 1-10 (2011).
Iyer et al., "Virtual platform architectures for resource metering in datacenters," SIGMETRICS Perform. Eval. Rev., vol. 37, No. 2, pp. 89-90 (Oct. 2009).
Jaeger et al., "Cloud Security: Challenges and Opportunities," USENIX HotCloud Workshop, Systems and Internet Infrastructure Security, Network and Security Research Center, Department of Computer Science and Engineering, slides 1-13 (Jun. 22, 2010).
Jain, The Art of Computer Systems Performance Analysis: Techniques for experimental design, measurement, simulation, and modeling, Wiley (1991).
Jambek et al., "Performance comparison of Huffman and Lempel-Ziv Welch data compression for wireless sensor node application," American Journal of Applied Sciences, vol. 11, No. 1, pp. 119-126 (2014).
Jones et al., "Impact of sub-optimal checkpoint intervals on application efficiency in computational clusters," Proceedings of the 19th ACM International Symposium on High Performance Distributed Computing, HPDC '10, New York, NY, USA, pp. 276-279 (2010).
Kadav et al., "Data mining standards," pp. 1-33 (2004).
Kadel et al., "Incremental algorithm for distributed data mining," 6th IEEE International Conference on Computer and Information Technology, CIT '06 (Sep. 2006).
Kahn, "Natural semantics," Proceedings of the 4th Annual Symposium on Theoretical Aspects of Computer Science, STACS '87, Springer-Verlag, pp. 22-39 (1987).
Kaliski Jr. et al., "Toward risk assessment as a service in cloud environments," pp. 1-7 (Publication Date Unknown).
Kannimuthu et al., "A distributed approach to extract high utility itemsets from XML data," International Journal of Computer, Information, Systems and Control Engineering, vol. 8, No. 3, pp. 471-479 (2014).
Kansal et al., "Virtual machine power metering and provisioning," Proceedings of the 1st ACM symposium on Cloud computing, SoCC '10, Indianapolis, Indiana, USA, pp. 39-50 (2010).
Karagiannis et al., "Metamodelling Platforms," ABSTRACT, Bauknecht et al. (Eds.): EC-Web 2002, Lecture Notes in Computer Science (LNCS) 2455, p. 182, Springer-Verlag Berlin Heidelberg (2002).
Koc et al., "Incrementally maintaining classification using an RDBMS," Proc. VLDB Endow., vol. 4, No. 5, pp. 302-313 (2011).
Kodituwakku et al., "Comparison of Lossless data compression algorithms for text data," Indian Journal of Computer Science and Engineering, vol. 1, No. 4, pp. 416-425 (Publication Date Unknown).
Koopmans, "Refining the cloud stack: A whitepaper on first lessons learned in the neon project," pp. 1-5 (Mar. 12, 2010).
Kopetz et al., "Integration of internal and external clock synchronization by the combination of clock-state and clock-rate correction in fault-tolerant distributed systems," Proceedings of the 25th IEEE International Real-Time Systems Symposium (RTSS 2004), IEEE Computer Society (2004).
Kouamou et al., "Experience with model sharing in data mining environments," Proceedings of the 2008 3rd International Conference on Software Engineering Advances, ICSEA '08, Washington, DC, USA, pp. 118-122 (2008).
Koushanfar et al., "Hardware Metering," DAC 2001, ACM, Las Vegas, Nevada, USA (Jun. 18-22, 2001).
Kranzlmüller et al., "Event manipulation for nondeterministic shared-memory programs," pp. 1-10 (Publication Date Unknown).

(56) References Cited

OTHER PUBLICATIONS

Krieger, "Cloud Computing," Cloud Architect, VMWARE, slides 1-35 (2009).
Krishnan et al., "VM power metering: Feasibility and challenges," pp. 56-60 (Publication Date Unknown).
Kumar et al., "A review: DWT-DCT technique and arithmetic-Huffman coding based image compression," I. J. Engineering and Manufacturing, vol. 3, pp. 20-33 (Sep. 2015).
Kwak et al., "Schedulability and optimal checkpoint placement for real-time multi-tasks," 2010 IEEE International Conference on Industrial Engineering and Engineering Management (IEEM), pp. 778-782 (Dec. 2010).
Lai et al., "An efficient data indexing approach on Hadoop using Java persistence API," Intelligent Information Processing V, 340, Springer, IFIP Advances in Information and Communication Technology, pp. 213-224 (2010).
Lai et al., "An efficient data mining framework on hadoop using Java persistence API," 2010 IEEE 10th International Conference on Computer and Information Technology (CIT), pp. 203-209 (Jun. 29-Jul. 1, 2010).
Lai et al., "On distributed snapshots," Information Processing Letters, vol. 25, pp. 153-158 (May 29, 1987).
Lamport, "Time, clocks, and the ordering of events in a distributed system," Communications of the ACM, vol. 21, No. 7, pp. 558-565 (1978).
Larson, "Erlang for concurrent programming," ACM Queue, pp. 26-36 (Sep. 2008).
Lee et al., "Multi-level intrusion detection system and log management in cloud computing," ICACT2011, pp. 552-555 (Feb. 13-16, 2011).
Lee et al., "UML-Based Modeling and Multi-Threaded Simulation for Hybrid Dynamic Systems," Proceedings of the 2002 IEEE International Conference on Control Applications, Glasgow, Scotland, UK, pp. 1207-1212 (Sep. 18-20, 2002).
Lemieux, "Hardware Performance Monitoring in Mulitprocessors," Master's Thesis, Department of Electrical and Computer Engineering, University of Toronto, pp. 1-89 (1996).
Leon-Guerrero et al., "Chapter 7: Testing Hypotheses," Essentials of Social Statistics for a Diverse Society, SAGE Publications, pp. 158-185 (Oct. 30, 2014).
Letchford, "A Tutorial on Mixed-Integer Non-Linear Programming," Department of Management Science, 29 slides (Nov. 2010).
Leyffer et al., "A Practical Guide to Mixed Integer Nonlinear Programming (MINLP)," SIAM Conference on Optimization, slides 1-232 (May 15, 2005). Sent by client Dec. 2, 2016.
Li et al., "An incremental algorithm for mining classification rules in incomplete information systems," IEEE Annual Meeting of the Fuzzy Information, Processing NAFIPS '04, vol. 1, pp. 446-449 (Jun. 2004).
Li et al., "An online power metering model for cloud environment," 2012 11th IEEE International Symposium on Network Computing and Applications (NCA), pp. 175-180 (2012).
Li et al., "CloudCmp: Shopping for a Cloud Made Easy," pp. 1-7 (Publication Date Unknown).
Li et al., "The strategy of mining association rule based on cloud computing," Proceedings of the 2011 International Conference on Business Computing and Global Informatization, BCGIN '11, Washington, DC, USA, pp. 475-478 (2011).
Lim et al., "Power budgeting for virtualized data centers," Proceedings of the 2011 USENIX Conference on USENIX Annual Technical Conference, USENIXATC '11, Berkeley, CA, USA, pp. 1-14(2011).
Lin et al., "An Incremental High-Utility Mining Algorithm with Transaction Insertion," pp. 1-41 (Publication Date Unknown).
Linux kvm.org. Kvm, kernel based virtual machine. http://www.linux-kvm.org/page/Main_Page, 2016 (Online; accessed Jan. 25, 2016).
Liu et al., "GreenCloud: A new architecture for green data center," ICAC-INDST '09, ACM, Barcelona, Spain, pp. 29-38 (Jun. 16, 2009).
Lo, "VMware and CPU Virtualization Technology," VMWorld2005, Virtualize Now, 34 slides (2005).
Lohr, "Google and I.B.M. Join in 'Cloud Computing' Research," The New York Times (Oct. 8, 2007).
Loosemore et al., "The GNU C library reference manual," http://www.gnu.org/software/libc/manual/pdf/libc.pdf, 2016 (Online; accessed Feb. 15, 2016).
Lumley et al., "The importance of the normality assumption in large public health data sets," Annual Review of Public Health, vol. 23, No. 1, pp. 151-169 (2002).
Lurig, PHP Reference: Beginner to Intermediate PHP5, Mario Lurig (2008).
Madhavapeddy et al., "Turning down the LAMP: Software specialisation for the cloud," pp. 1-7 (Publication Date Unknown).
Madhavapeddy et al., "Unikernels: The Rise of the Virtual Library Operating System," Communications of the ACM, vol. 57, No. 1, pp. 61-69 (Jan. 2014).
Malik, Efficient Algorithms for Clustering and Classifying High Dimensional Text and Discretized Data Using Interesting Patterns, PhD thesis, Graduate School of Arts and Sciences, New York, NY, USA, AAi3305249 (2008).
Manoukian et al., "Exact Critical Values of Bartlett's Test of Homogeneity of Variances for Unequal Sample Sizes for two Populations and Power of the Test," Metrika, vol. 33, pp. 275-289 (1986).
Marrington et al., "Event-based computer profiling for the forensic reconstruction of computer activity," AusCERT Asia Pacific Information Technology Security Conference (AusCERT2007): Refereed R&D Stream, University of Queensland, Gold Coast, Qld, pp. 71-87 (2007).
Marsaglia et al., "Evaluating the Anderson-Darling distribution," Journal of Statistical Software, vol. 9, No. 1, pp. 1-5 (2004).
Marschner, GLM2: Fitting Generalized Linear Models, R package version 1.1.2 (2014).
Marty, "Cloud application logging for forensics," Proceedings of the 2011 ACM Symposium on Applied Computing, SAC '11, TaiChung, Taiwan (2011).
Masud et al., "Classification and novel class detection of data streams in a dynamic feature space," Proceedings of the 2010 European Conference on Machine Learning and Knowledge Discovery in Databases: Part II, ECML PKDD '10, Berlin, Heidelberg, Springer-Verlag, pp. 337-35 (2010).
Mattern, "Virtual time and global states of distributed systems," pp. 120-131 (1989).
McDowell et al., "Debuggin concurrent programs," ACM Comput. Surv., vol. 21, No. 4, pp. 593-622 (Dec. 1989).
McRae, "Hardware Profiling of Kernels," 1993 Winter USENIX, San Diego, CA, pp. 375-386 (Jan. 25-29, 1993).
Meiers, "Cloud metering and billing: Billing metrics for compute resources in the cloud," IBM developerWorks, pp. 1-10 (Aug. 8, 2011).
Meyer, "Software Verification: Lecture 2: Axiomatic semantics," ETH Zurich, Chair of Software Engineering, slides 1-58 (Publication date unknown).
Michael, "VMware vCloud Director: Architecting Your Private Cloud v1.0," VMware vCloud™Director, A Private Cloud Architecure Design, www.hypervizor.com (Sep. 12, 2010).
Miettinen et al., "Energy efficiency of mobile clients in cloud computing," pp. 1-7 (2010).
Minsky et al., "OCaml for the Masses: Why the next language you learn should be functional," ACMQueue, Programming Languages, pp. 1-10 (2011).
Moakar et al., "Admission control mechanisms for continuous queries in the cloud," 2010 IEEE 26th International Conference on Data Engineering (ICDE), pp. 409-412 (Mar. 2010).
Moffat et al., "In-place calculation of minimum-redundancy codes," pp. 393-402 (1995).
Montgomery, Design and Analysis of Experiments, 8th Edition, John Wiley & Sons (2013).
Mordkoff, "The Assumption(s) of Normality," pp. 1-6 (2011).
Morent et al., "Comprehensive PMML Preprocessing in KNIME," AG & Konstanz University, slides 1-44 (2011).

(56) References Cited

OTHER PUBLICATIONS

Morzy et al., "Incremental data mining using concurrent online refresh of materialized data mining views," Proceedings of the 7th International Conference on Data Warehousing and Knowledge Discovery, DaWaK '05, Berlin, Heidelberg, Springer-Verlag, pp. 295-304 (2005).
Mosses, "Modular structural operational semantics," Basic Research in Computer Science (BRICS) Report Series, RS-05-7 (2005).
Mucci et al., "PAPI: A portable interface to hardware performance counters," University of Tennessee, 8 pages total (Sep. 28, 1999).
Murray et al., "Scripting the cloud with Skywriting," pp. 1-7 (Publication Date Unknown).
Myreen, "Formal specification and big-step operational semantics," Lecture 2, MPhil ACS & Part III course, Functional Programming: Implementation, Specification and Verification, 64 slides (2013).
Myreen, "Small-step operational semantics and SML," MPhil ACS & Part III course, Functional Programming: Implementation, Specification and Verification, Lecture 3, slides 1-71 (2013).
MySQL Website. MySQL project. https://www.mysql.com/, 2016 (Online; accessed Jan. 22, 2016).
MySQL Website. MySQL replication. http://dev.mysql.com/doc/refman/5.7/en/replication.html, 2016 (Online; accessed Jan. 25, 2016).
Nae et al., "Dynamic resource provisioning in massively multiplayer online games," IEEE IEEE Transactions on Parallel and Distributed Systems, pp. 1-16 (Mar. 2011).
Naik et al., "Service usage metering in hybrid cloud environments," 2014 IEEE International Conference on Cloud Engineering (IC2E), pp. 253-260 (Mar. 2014).
Nair et al., "Data mining using hierarchical virtual k-means approach integrating data fragments in cloud computing environment," 2011 IEEE International Conference on Cloud Computing and Intelligence Systems (CCIS), pp. 230-234 (Sep. 2011).
Najafzadeh et al., "Towards a framework for source code instrumentation measurement validation," Proceedings of the 5th International Workshop on Software and Performance, WOSP '05, Palma de Mallorca, Spain, pp. 123-130 (2005).
Nakahara et al., "A study on the requirements of accountable cloud services and log management," 2010 8th Asia-Pasific Symposium on Information and Telecommunication Technologies (APSITT), pp. 1-6 (Jun. 2010).
Narayan et al., "Power-aware cloud metering," IEEE Transactions on Services Computing, vol. 7, No. 3, pp. 440-451 (Jul.-Sep. 2014).
Narayan et al., "Smart metering of cloud services," IEEE, pp. 1-7 (2012).
Narayan et al., "Smart metering of cloud services," International Institute of Information Technology Bangalore, Technical Report IIITB-OS-2011-5A, pp. 1-31 (Apr. 2011).
NetBeans. Netbeans. https://netbeans.org/, 2014 (Online; accessed Nov. 16, 2014).
Nethercote et al., "Valgrind: A framework for heavyweight dynamic binary instrumentation," Proceedings of the 28th ACM SIGPLAN Conference on Programming Language Design and Implementation, PLDI '07, New York, NY, USA, pp. 89-100 (2007).
Nethercote et al., "Valgrind: A program supervision framework," Electronic Notes in Theoretical Computer Science, vol. 89, No. 2, pp. 44-66 (2003).
Nethercote, Dynamic binary analysis and instrumentation, PhD thesis, Technical Report UCAM-CL-TR-606, University of Cambridge (2004).
Newbury et al., "Potential metering communication services using the public internet," IEEE Transactions on Power Delivery, vol. 14, No. 4, pp. 1202-1207 (Oct. 1999).
Open Stack. Open stack. http://www.openstack.org/, 2014 (Online; accessed Nov. 16, 2014).
OpenStack Website. Openstack ceilometer measurements. http://docs.openstack.org/admin-guide-cloud/telemetry-measurements.html, 2016 (Online; Feb. 11, 2016).
OpenStack Website. Openstack ceilometer overview. http://docs.openstack.org/developer/ceilometer/overview.html, 2016 (Online; accessed Feb. 11, 2016).
OpenStack Website. Openstack telemetry project wiki. https://wiki.openstack.org/wiki/Telemetry, 2016 (Online; accessed Feb. 11, 2016).
Oracle, "Oracle cloud management pack for Oracle database," Technical report, Oracle (2014).
Ortiz et al., "Planning for data mining tool (PDM) extended abstract," Association for the Advancement of Artificial Intelligence, pp. 21-24 (2010).
Öztuna et al., "Investigation of four different normality tests in terms of type 1 error rate and power under different distributions," Turkish Journal of Medical Sciences, vol. 36, No. 3 (2006).
Pandey et al., "Authentication and billing framework for service oriented architecture," 4th International Conference on Systems, IEEE Computer Society, pp. 91-95 (2009).
Passing, "The Google File System and its application in MapReduce," pp. 1-14 (2008).
Patil et al., "VirtPerf: A performance profiling tool for virtualized environments," 2011 IEEE 4th International Conference on Cloud Computing, IEEE Computer Society, pp. 57-64 (2011).
Pavlo et al., "A comparison of approaches to large-scale data analysis," SIGMOD 09: Proceedings of the 35th SIGMOD International Conference on Management of Data, pp. 165-178 (2009).
Pearson, "Taking account of privacy when designing cloud computing services," CLOUD '09, ICSE '09 Workshop, Vancouver, Canada, pp. 44-52 (May 23, 2009).
Pechter, "PMML Conformance Progress Report—Five Years Later," MicroStrategy, Inc., slides 1-16 (2011).
Peng et al., "Implementation issues of a cloud computing platform," IEEE Data Eng. Bull., vol. 32, No. 1, pp. 59-66 (2009).
Pereira da Silva et al., "Monext: An accounting framework for infrastructure clouds," 2013 IEEE 12th International Symposium on Parallel and Distributed Computing (ISPDC), pp. 26-33 (Jun. 2013).
Pereira da Silva et al., "VeloZ: A charging policy specification language for infrastructure clouds," 2013 22nd International Conference on Computer Communications and Networkds (ICCCN), pp. 1-7 (Jul. 2013).
Petersson, "Cloud metering and billing: Billing metrics for compute resources in the cloud," IBM developerWorks (Aug. 8, 2011).
Petri, "Shedding light on cloud computing," Primer, CA Technologies, pp. 1-60 (Oct. 2010).
Phyu, "Survey of classification techniques in data mining," Proceedings of the International MultiConference of Engineers and Computer Scientists, IMECS 2009, vol. 1, Hong Kong (2009).
Piro et al., "An economy-based accounting infrastructure for the datagrid," Proceedings of the 4th International Workshop on Grid Computing, GRID '03, IEEE Computer Society, Washington, DC, USA, pp. 202-204 (2003).
Piro et al., "Simulation of price-sensitive resource brokering and the hybrid pricing model with DGAS-SIM," Proceedings of the 13th IEEE International Workshops on Enabling Technologies: Infrastructure for Collaborative Enterprises, WETICE '04, Washington, DC, USA, IEEE Computer Society, pp. 325-330 (2004).
Piro et al., "Tracing resource usage over heterogeneous grid platforms: A prototype rus interface for DGAS," Proceedings of the 3rd IEEE International Conference on e-Science and Grid Computing, E-SCIENCE '07, IEEE Computer Society, Washington, DC, USA, pp. 93-101 (2007).
Plotkin, "A structural approach to operational semantics," pp. 1-133 (2004).
Plotkin, "The origins of structural operational semantics," The Journal of Logic and Algebraic Programming 60-61, pp. 3-15 (2004).
Poetzsch-Heffter et al., "Programming Language Semantics," Chapter 7, TU Kaiserslautern, pp. 331-446 (publication date unknown).
Popescu et al., "Adaptive query execution for data management in the cloud," Proceedings of the 2nd International Workshop on Cloud Data Management, CloudDB '10, Toronto, Ontario, Canada, pp. 17-24 (2010).
PostgreSQL Website. PostgreSQL project. http://www.postgresql.org/, 2016 (Online; accessed Jan. 22, 2016).

(56) References Cited

OTHER PUBLICATIONS

Poulsen et al., "Deriving Pretty-Big-Step Semantics from Small-Step Semantics," Z. Shao (Ed.), ESOP 2014, LNCS 8410, pp. 270-289, Springer-Verlag Berlin Heidelberg (2014).
Pradeepini et al., "Tree-based incremental association rule mining without candidate itemset generation," Trendz in Information Sciences Computing (TISC) 2010, pp. 78-81 (Dec. 2010).
PYSphere. Pysphere. https://code.google.com/p/pysphere/, 2014 (Online; accessed Nov. 16, 2014). Redirected to https://github.com/argos83/pysphere (Online; accessed Jul. 12, 2016).
Qemu.org. Qemu, open source processor emulator. http://wiki.qemu.org/Main_Page, 2016 (Online; accessed Jan. 25, 2016).
Qiu et al., "An accounting and charging system for grid," Proceedings of the 2009 International Joint Conference on Artificial Intelligence, JCAI '09, Washington, DC, USA, IEEE Computer Society, pp. 841-844 (2009).
QT4 Website. QT4 documentation. http://doc.qt.io/qt-4.8/, 2016 (Online; accessed Feb. 3, 2016).
R Core Team, The R Project for Statistical Computing, R Foundation for Statistical Computing, Vienna, Austria (2015).
R Project. R language project for statistical computing. http://www.r-project.org/, 2013 (Online; accessed Sep. 20, 2013).
Raghavan et al., "Cloud control with distributed rate limiting," SIGCOMM '07, Kyoto Japan (Aug. 27-31, 2007).
Redmond et al., "Dynamic charging for information services," The Institution of Electrical Engineers, pp. 13/1-13/10 (1997).
Ren et al., "Google-wide profiling: A continuous profiling infrastructure for data centers," Micro, IEEE, vol. 30, No. 4, pp. 65-79 (Jul.-Aug. 2010).
Renear et al., "Towards a semantics for XML markup," DocEng '02, ACM, McLean, Virginia, USA, pp. 119-126 (Nov. 8-9, 2002).
Riley, "How to 'Think Cloud,'" Architectural Design Patterns for Cloud Computing, 42 slides (Publication date unknown).
Rimal et al., "A taxonomy and survey of cloud computing systems," Proceedings of the 2009 5th International Joint Conference on INC, IMS, and IDC, NCM '09, Washington, DC, USA, IEEE Computer Society, pp. 44-51 (2009).
Rosu, "Programming Language Semantics: A rewriting approach," University of Illinois at Urbana-Champaign, pp. 171-210 (Spring 2013).
R-Studio. Rstudio—R language IDE development environment. http://www.rstudio.com/, 2013 (Online; accessed Sep. 20, 2013).
Ryan, "Logic in Computer Science: Modelling and reasoning about systems," Errata for the First Printing of the Second Edition, pp. 1-6 (Jan. 21, 2009).
Salomon, "A Concise Introduction to Data Compression," Undergraduate Topics in Computer Science, Springer-Verlag London Limited (2008).
Santos et al., "Bridging the gap between software and hardware techniques for I/O virtualization," USENIX 2008 Annual Technical Conference, ATC '08, Berkeley, CA, USA, USENIX Association, pp. 29-42 (2008).
Sarda et al., "An adaptive algorithm for incremental mining of association rules," Proceedings of the 9th International Workshop on Database and Expert Systems Applications, DEXA '98, Washington, DC, USA, IEEE Computer Society, pp. 240-245 (1998).
Schmidt, "Denotational Semantics: A methodology for language development," (1997).
Schnjakin et al., "Contract-based cloud architecture," CloudDB '10, ACM, Toronto, Ontario, Canada, pp. 33-40 (Oct. 30, 2010).
Seelemann, "Limiting the probe effect in debugging concurrent object-oriented programs," Department of Computer Science, University of Waterloo, pp. 1-12 (Publication Date Unknown).
Seetharaman, "Power Virtualization in Multi-tenant Networks," Deutsche Telekom R&D Lab USA, Clean Slate Lab, Stanford University, slides 1-15 (Oct. 2010).
Serebrin et al., "Virtualizing performance counters," ACM Trans. Comput. Syst. (2011).
Shahbahrami et al., "Evaluation of Huffman and arithmetic algorithms for multimedia compression standards," arXiv preprint arXiv:1109.0216 (2011).
Shapiro, "Self-healing in modern operating systems," ACM Queue, pp. 67-75 (Dec. 2004-Jan. 2005).
Shenoy, "Barriers to Cloud Adoption and Research Opportunities," University of Massachussetts Amherst, 4 slides (publication date unknown).
Shieh et al., "Seawall: Performance isolation for cloud datacenter networks," pp. 1-7 (Publication Date Unknown).
Shields et al., "Common Event Expression," MITRE Corporation, slides 1-30 (2009).
Shin et al., "Applied Computing 2010," The 25th Annual ACM Symposium on Applied Computing, Proceedings of the 2010 ACM Symposium on Applied Computing, Sierre, Switzerland, pp. 1-41 (Mar. 22-26, 2010).
Shirriff, "Building distributed process management on an object-oriented framework," Proceedings of the USENIX Annual Technical Conference, ATEC '97, USENIX Association, Anaheim, CA, USA, p. 9 (1997).
Silva et al., "Accounting federated clouds based on the jitcloud platform," 2013 13th IEEE/ACM International Symposium on Cluster, Cloud and Grid Computing (CCGrid), pp. 186-187 (May 2013).
Singh et al., "Smart metering the clouds," 18th IEEE International Workshops on Enabling Technologies: Infrastructures for Collaborative Enterprises, WETICE '09, pp. 66-71 (Jun. 29-Jul. 1, 2009).
Sit et al., "Cyclone: A high-performance cluster-based web server with socket cloning," Cluster Computing, vol. 7, No. 1, pp. 21-37 (Jan. 2004).
Sit, "Cyclone: A high-performance cluster-based web server with socket cloning," The HKU Scholars Hub, The University of Hong Kong, pp. 1-63 (2002).
Slonnege et al., "Chapter 8: Traditional Operational Semantics," Formal Syntax and Semantics of Programming Languages, pp. 223-270 (1995).
Smith et al., "Virtual Machines: Architectures, Implementations and Applications," Hotchips 17, Tutorial 1, Part 2, University of Wisconsin-Madison, slides 1-51 (Aug. 14, 2005).
Srikantaiah et al., "Energy aware consolidation for cloud computing," Proceedings of the 2008 Conference on Power Aware Computing and Systems, HotPower '08, Berkeley, CA, USA, USENIX Association, p. 10 (2008).
Srivastava et al., "Atom: A system for building customized program analysis tools," Proceedings of the ACM SIGPLAN 1994 Conference on Programming Language Design and Implementation, pp. 196-205 (Mar. 1994).
Steiner, "A generalisation approach to temporal data models and their implementations," Dissertation Submitted to the Swiss Federal Institute of Technology, Zürich, Diss. ETH No. 12434, pp. 1-163 (1998).
Stoica, "Barriers to Cloud Adoption and Research Opportunities," UC Berkeley, 5 slides (publication date unknown).
Subramanian et al., "A novel approach to extract high utility itemsets from distributed databases," Computing and Informatics, vol. 31, pp. 1597-1615 (2012).
Sun et al., "A modified incremental learning approach for data stream classification," 2012 6th International Conference on Internet Computing for Science and Engineering (ICICSE), pp. 122-125 (Apr. 2012).
Sundmark et al., "Efficient system-level testing of embedded real-time software," pp. 1-4 (Publication Date Unknown).
Sysstats. Sysstats. http://sysstats.jools.net/, 2012 (Online; accessed Apr. 15, 2012).
Tanenbaum et al., Distributed Systems: Principles and Paradigms, Prentice Hall PTR, Upper Saddle River, NJ, USA, 2nd Edition (2007).
Tenable Network Security, "Log correlation engine best practices," Revision 1, Tenable Network Security, Inc., pp. 1-49 (Mar. 30, 2011).
Teregowda et al., "CiteSeerx: a Cloud Perspective", Pennsylvania State University, pp. 1-7 (Publicaiton Date Unknown).

(56) References Cited

OTHER PUBLICATIONS

Thane et al., "Debugging using time machines: Replay your embedded systems history," pp. 1-10 (2001).
Thane, "Design for deterministic monitoring of distributed real-time systems," Technical report, Mlardalen Real-Time Research Centre (2000).
Thomas et al., "Incremental mining of constrained associations," High Performance Computing HiPC 2000, vol. 1970 of Lecture Notes in Computer Science, Springer Berlin Heidelberg, pp. 547-558 (2000).
Tikir et al., "Using hardware counters to automatically improve memory performance," IEEE, pp. 1-12 (2004).
Tu et al., "A power-aware cloud architecture with smart metering," 2010 39th International Conference on Parallel Processing Workshops (ICPPW), pp. 497-503 (Sep. 2010).
Upton et al., "On the causes of outliers in Affymetrix GeneChip data," Briefings in Functional Genomics and Proteomics, vol. 8, No. 3, pp. 199-212 (2009).
Vaarandi, "A data clustering algorithm for mining patterns from event logs," 3rd IEEE Workshop on IP Operations Management (IPOM 2003), pp. 119-126 (Oct. 2003).
Vadnere et al., "Incremental classification using Feature Tree," ArXiv e-prints (Feb. 2014).
Varia, "Cloud Architectures," Amazon Web Services (Jun. 2008).
Venkatadri et al., "A review on data mining from past to future," International Journal of Computer Applications, vol. 15, No. 7, pp. 19-22, Published by Foundation of Computer Science (Feb. 2011).
Venkatamohan, "Automated implementation of stateful firewalls in Linux," Thesis, North Carolina State University (2011).
Virtualbox.org. Virtualbox. https://www.virtualbox.org/, 2016 (Online; accessed Jan. 25, 2016).
Visic et al., "A domain-specific language for modeling method definition: from requirements to grammar," IEEE (2015).
Visual Paradigm. Visual paradigm. http://www.visual-paradigm.com/, 2014 (Online; accessed Nov. 16, 2016).
VMware. Vmware workstation player. https://www.vmware.com/products/player, 2016 (Online; accessed Jan. 25, 2016).
VMware. VMware. http://www.vmware.com/, 2014 (Online; accessed Nov. 16, 2014).
Vo et al., "Parallel method for mining high utility itemsets from vertically partitioned distributed databases," Proceedings of the 13th International Conference on Knowledge-Based and Intelligent Information and Engineering Systems: Part I, KES '09, Berlin, Heidelberg, Springer-Verlag, pp. 251-260 (2009).
Vouk, "Cloud computing—Issues, research and implementations," Journal of Computing and Information Technology—CIT 16, 2008, 4, pp. 235-246 (2008).
Vu Do et al., "Profiling applications for virtual machine placement in clouds," 2011 IEEE 4th International Conference on Cloud Computing, IEEE Computer Society, pp. 660-667 (2011).
W3.org. The extensible stylesheet language family (XSL). http://www.w3.org/Style/XSL/, 2014 (Online; accessed Nov. 16, 2014).
W3C. Overview of SGML resources. https://www.w3.org/MarkUp/SGML/, 2016 (Online; accessed Jan. 25, 2016).
Wachter, "Some Recent Advances in Mixed-Integer Nonlinear Programming," IBM T.J. Watson Research Center, SIAM Conference on Optimization 2008, 75 slides (May 12, 2008).
Wadler, "A formal semantics of patterns in XSLT," pp. 1-15 (Mar. 29, 2000).
Walli et al., "The POSIX family of standards," StandardView, vol. 3, No. 1, pp. 11-17 (Mar. 1995).
Wang et al., "A collaborative monitoring mechanism for making a multitenant platform accountable," pp. 1-7 (Publication Date Unknown).
Wang et al., "Distributed systems meet economics: Pricing in the cloud," Proceedings of the 2nd USENIX Conference on Hot Topics in Cloud Computing, HotCloud '10, Berkeley, CA, USA, USENIX Association, p. 6 (2010).
Wang et al., "Scalable run-time correlation engine for monitoring in a cloud computing environment," 2010 17th IEEE International Conference and Workshops on Engineering of Computer Based Systems (ECBS), pp. 29-38 (Mar. 2010).
Wang, "An incremental classification algorithm for mining data with feature space heterogeneity," Mathematical Problems in Engineering, vol. 2014, Article ID 327142, pp. 1-9 (2014).
Weber, "Interactive Formal Verification 8: Operational Semantics," Computer Laboratory, University of Cambridge, 57 slides (Publicaiton date unknown).
Wei et al., "Research of System Modeling and Verification Method Combine with UML Formalization Analysis and Colored Petri Net," 2009 3rd International Symposium on Intelligent Inormation Technology Application, IEEE Computer Society, pp. 488-491 (2009).
Weidendorfer, "Sequential performance analysis with Callgrind and KCachegrind," Tools for High Performance Computing: Proceedings of the 2nd International Workshop on Parallel Tools for High Performance Computing, Jul. 2008, HLRS, Stuttgart, Springer Berline Heidelberg, pp. 93-113 (2008).
Weimer, "Operational Semantics; Small-Step Semantics," Computer Science, The University of Virginia, https://www.cs.virginia.edu/~weimer/2006-615/lectures/weimer-615-03.pdf, 7 pages (Aug. 31, 2006).
Wen et al., "Runassert: A non-intrusive run-time assertion for parallel programs debugging," Proceedings of the Conference on Design, Automation and Test in Europe, DATE '10, European Design and Automation Association, pp. 287-290 (2010).
Wettschereck et al., "Visualization and evaluation support of knowledge discovery through the predictive model markup language," pp. 1-8 (Publication Date Unknown).
Wikipedia. Advanced configuration and power interface. http://en.wikipedia.org/wiki/Advanced_Configuration_and_Power_Interface, 2012 (Online; accessed Apr. 15, 2012).
Wikipedia. Cloud computing. http://en.wikipedia.org/wiki/Cloud_computing, 2012 (Online; accessed Apr. 15, 2012).
Wikipedia. Event monitoring. http://en.wikipedia.org/wiki/Event_monitoring, 2012 (Online; accessed Apr. 15, 2012).
Wikipedia. Grid computing. http://en.wikipedia.org/wiki/Grid_computing, 2012 (Online; acessed Apr. 15, 2012).
Wikipedia. Probe effect. http://en.wikipedia.org/wiki/Probe_effect, 2012 (Online; accessed Apr. 15, 2012).
Wikipedia. Profiling (computer programming). http://en.wikipedia.org/wiki/Profiling_%28computer_programming%29, 2012 (Online; accessed Apr. 15, 2012).
Wikipedia. System monitor. http://en.wikipedia.org/wiki/System_monitor, 2012 (Online; accessed Apr. 15, 2012).
Wikipedia. Top (software). http://en.wikipedia.org/wiki/Top_%28software%29, 2012 (Online; accessed Apr. 15, 2012).
Wikipedia. Wireshark. http://en.wikipedia.org/wiki/Wireshark, 2012 (Online; accessed Apr. 15, 2012).
Williams et al., "Package 'pmml': Generate PMML for various models," Version 1.2.28, pp. 1-18 (Jan. 16, 2012).
Winskel, "Lecture notes on Denotational Semantics for Part II of the Computer Science Tripos," Cambridge University Computer Laboratory, pp. 1-80 (2005).
Wolf et al., "On balancing the load in a clustered web farm," ACM Transactions on Internet Technology, vol. 1, No. 2, pp. 231-261 (Nov. 2001).
Wood et al., "Disaster recovery as a cloud service: Economic benefits & deployment challenges," HotCloud '10, Proceedings of the 2nd USENIX Conference on Hot Topics in Cloud Computing, Boston, MA, pp. 1-7 (Jun. 22-25, 2010).
Wu et al., "High-Performance Complex Event Processing over Streams," SIGMOD 2006, ACM, Chicago, Illinois, USA, pp. 407-418 (Jun. 27-29, 2006).
Xingxing et al., "A novel method to integrate spatial data mining and geographic information system," Proceedings of the 2005 IEEE International Geoscience and Remote Sensing Symposium, IGARSS '05, vol. 2, p. 4 (Jul. 2005).
XML-RPC.com. XML-RPC specification. http://xmlrpc.scripting.com/spec.html, 2016 (Online; accessed Jan. 25, 2016).
Yafi et al., "Incremental mining of shocking association patterns," World Academy of Science, Engineering and Technology, International Journal of Computer, Electrical, Automation, Control and Informtation Engineering, vol. 3, No. 1, pp. 114-118 (2009).

(56) References Cited

OTHER PUBLICATIONS

Ye et al., "A scalable, incremental learning algorithm for classification problems," Comput. Ind. Eng., vol. 43, No. 4, pp. 677-692 (Sep. 2002).

Yigitbasi et al., "C-meter: A framework for performance analysis of computing clouds," 9th IEEE/ACM International Symposium on Cluster Computing and the Grid, CCGRID '09, pp. 472-477 (May 2009).

Yoon, "Vicarious certification and billing agent for web information service," pp. 1-6 (Publication Date Unknown).

Youquan et al., "The dynamic data reduction and association rule parallel mining based on rough set," Proceedings of the 8th World Congress on Intelligent Control and Automation, Jinan, China, pp. 2803-2806 (Jul. 6-9, 2010).

Youseff et al., "Toward a unified ontology of cloud computing," pp. 1-10 (Publication Date Unknown).

Zaharia et al., "Spark: Cluster computing with sorking sets," pp. 1-7 (Publication Date Unknown).

Zeller et al., "Open standards and cloud computing KDD-2009 panel report," KDD '09, ACM, Paris, France, pp. 1-8 (Jun. 28-Jul. 1, 2009).

Zeng et al., "Modelling cloud computing architecture without compromising privacy: A Privacy by Design approach," NEC Company, Ltd. and Information and Privacy Commissioner, Ontario, Canada, pp. 1-26 (May 2010).

Zhang et al., "Flexible and secure logging of grid data access," 2006 IEEE Grid Computing Conference, pp. 80-87 (2006).

Zhang et al., "Processor hardware counter statistics as a first-class system resource," Proceedings of the 11th USENIX Workshop on Hot Topics in Operating Systems, HOTOS '07, Berkeley, CA, USA, pp. 14:1-14:6 (2007).

Zhang et al., "Profiling and analysis of power consumption for virtualized systems and applications," IEEE, 2 pages total (2010).

Zhao et al., "CacheScouts: Fine-grain monitoring of shared caches in CMP platforms," 16th International Conference on Parallel Architecture and Compilation Techniques, IEEE Computer Society, pp. 339-349 (2007).

Zhao et al., "ESQP: An efficent SQL query processing for cloud data management," Proceedings of the 2nd International Workshop on Cloud Data Management, CloudDB '10, Toronto, Ontario, Canada, pp. 1-8 (2010).

Zheng, "Constructing Optimal Search Trees in Optimal Time," IEEE Transactions on Computers, vol. 48, No. 7, pp. 738-743 (Jul. 1999).

Zhou et al., "Time related association rules mining with attributes accumulation mechanism and its application to traffic prediction," IEEE Congress on Evolutionary Computation, CEC 2008, IEEE World Congress on Computational Intelligence, pp. 305-311 (Jun. 2008).

Zimek et al., "Frequent pattern mining algorithms for data clustering," Frequent Pattern Mining, Chapter 16, Springer International Publishing, pp. 403-423 (2014).

Sobh et al., "Mining Cloud Environments Usage Data," Proceedings of the LASTED International Conference, Parallel and Distributed Computing and Networks (PDCN), pp. 645-655 (Feb. 2013).

\* cited by examiner

CLOUD COMPUTING SYSTEMS

PRIORITY CLAIM

This application claims the benefit of U.S. Provisional Application Ser. No. 62/187,607, filed Jul. 1, 2015, the disclosure of which is incorporated herein by reference in its entirety.

TECHNICAL FIELD

The subject matter herein generally relates to cloud computing metering systems, and more particularly, to methods, systems, and computer readable media for metering cloud computing systems according to a cloud metering framework and building virtual machines that span physical boundaries.

BACKGROUND

A cloud environment, in its most general form, is like a market place. A distributed application owned by a single user can share different resources owned by different service providers, which are assigned to the user by the cloud middleware based on the application needs. A cloud application can utilize different resources at different architectural layers such as the hardware layer, the virtualization layer, and the application layer. As used in this document, a resource can be any shareable computing entity. A resource can be primitive or composite, where composite resources are built on other primitive or composite resources. For example, a virtual machine is a composite resource that is built up of CPUs, RAM, virtual disks, etc.

Cloud users are being charged back for their resource usage based on flat rate time plans. The market competition influences the need for an accurate metering standard, such that users can be charged accurately for their usage. A cloud resource is being shared between different applications through multiplexing, and consequently the proposed framework should be capable of correlating an application's resource usage, and providing different metering granularity levels.

SUMMARY

Methods, systems, and computer readable media for metering a cloud computing system are disclosed. In some examples, a method includes collecting, by a cloud metering system built using a cloud metering framework and implemented at least partially on one or more processors of the cloud computing system, resource usage data for each of a plurality of cloud computing applications executing on the cloud computing system. The method includes packaging, by the cloud metering system, the resource usage data into cloud metering objects (CMOs), each cloud metering object comprising the resource usage data and one or more operations for processing the resource usage data. The method includes correlating, by the cloud metering system, the cloud metering objects by grouping related cloud metering objects and creating a plurality of correlated cloud metering objects. The method includes metering, by the cloud metering system, the cloud computing applications using the correlated cloud metering objects.

Methods, systems, and computer readable media for an operating system instance to view one or more cloud resources as local to the operating system instance are disclosed. In some examples, a method includes building, by a cross hypervisor executing the operating system instance and implemented on a cloud computing system comprising a plurality of processors and memory operatively connected by a data communications network for executing a plurality of cloud computing applications for providing software services, a virtual machine that spans across at least one physical boundary between two physical cloud nodes over the data communications network. The method includes starting, by the cross hypervisor, a respective hypervisor on each of the two physical cloud nodes that runs an operating system that adopts a service oriented architecture. The method includes sending, by the cross hypervisor, interprocessor interrupts over the data communications network to the hypervisors for one or more local cores of the two physical cloud nodes.

The cross-hypervisor described in this document can be based on BOSML and IPIoE and, in some examples, can cater on many service oriented applications, for example, cloud metering. Cloud metering systems can be built using the cross hypervisor and the cross hypervisor can be used to build other service oriented applications. Also the framework can be implemented, in some examples, using traditional software components running on traditional operating systems and service oriented engines. In general, the cross hypervisor can be used in various kinds of distributed applications, and the BOSML OS is practically a distributed operating system that can serve many purposes. CMML can be extended to BOSML and the cross hypervisor can be used as an alternative for the metering framework implementation, in addition to other applications.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
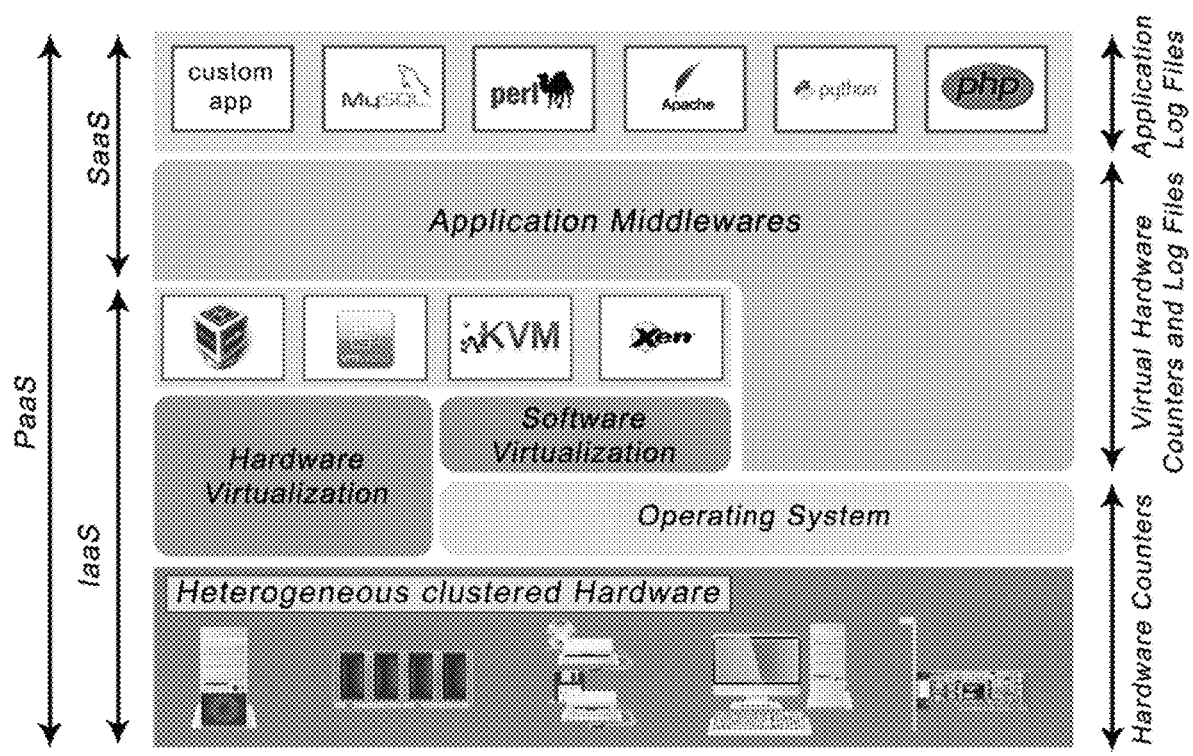
FIG. 1 is a block diagram of an example cloud computing system.

FIG. 1 is a block diagram of an example cloud computing system. Cloud environments are like a market place. A single distributed application owned by a single user can share different resources owned by different service providers. A cloud application can utilize different resources at different architectural layers, namely hardware, virtualization, and application layer. A resource can be primitive or composite, e.g. a virtual machine is a composite resource that is built up of a number of primitive resources such as CPUs, RAM, virtual disks, etc.

Cloud users are being charged for their usage based on flat rate time plans. The market competition urges for accurate metering standards for charging users. A cloud resource is shared through multiplexing mechanisms, and the proposed framework is capable of correlating resources usage across different architectural layers, where by different metering abstraction levels can be achieved.

Moreover, a mechanism for monitoring cloud resources usage based on predefined threshold should be in place to make sure on one hand that the target cloud application is getting the resources it needs, and on the other hand does not overuse or abuse such resources. The guarded Service Level Agreements (SLA) should be monitored in a way that actions should be taken upon their violations.

The proposed framework is based on a modeling extensible Cloud Metering Markup Language (CMML) coupled with a scalable multi-tier architecture. Metering Model shareablity, as well as low overhead execution of metering engines running on the cloud resources are key features.

Overview

Cloud environments consolidate computing resources located in different architectural layers as shown in FIG. 1. The complexity of accurate metering arises from multiplexing cloud resources among different applications. Virtualization is another dimension of complexity resulting from unsynchronized virtual clocks, leading to inaccurate metering results from within a virtual machine. Correlating metering data generated from distributed virtual resources is a complex challenging task by nature.

Figure 2A:
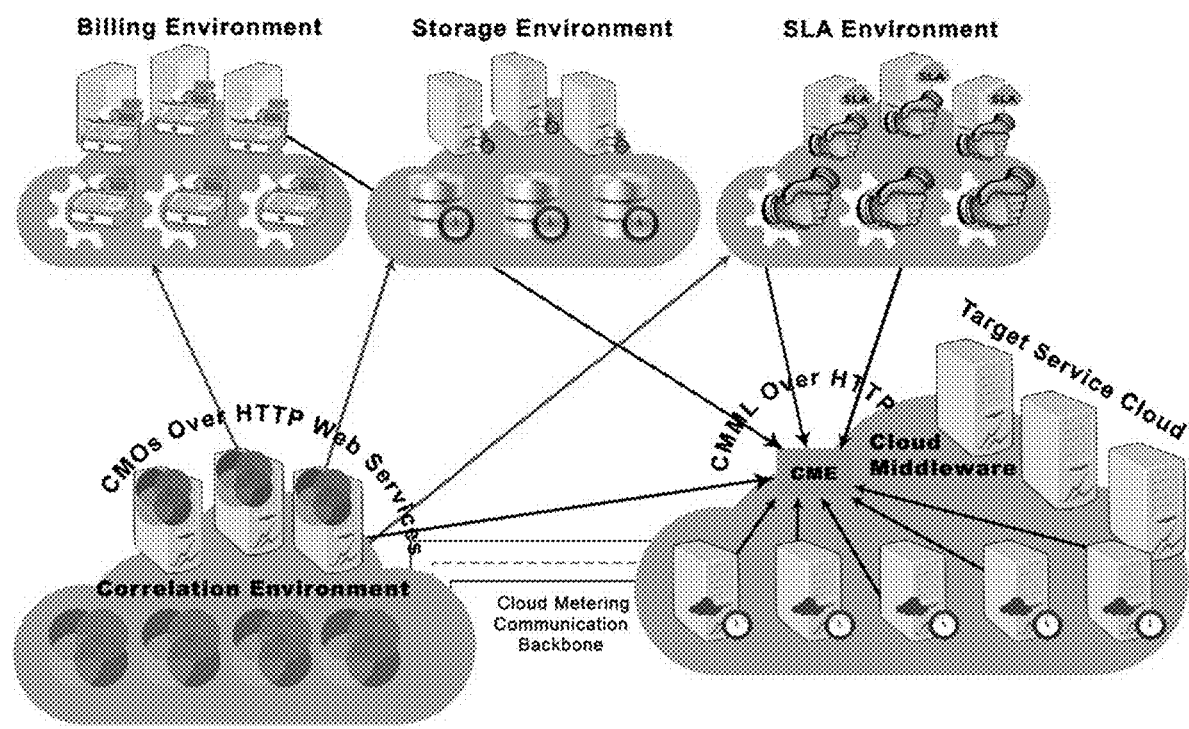
FIGS. 2A-C are block diagrams of example cloud metering systems.
Figure 2B:
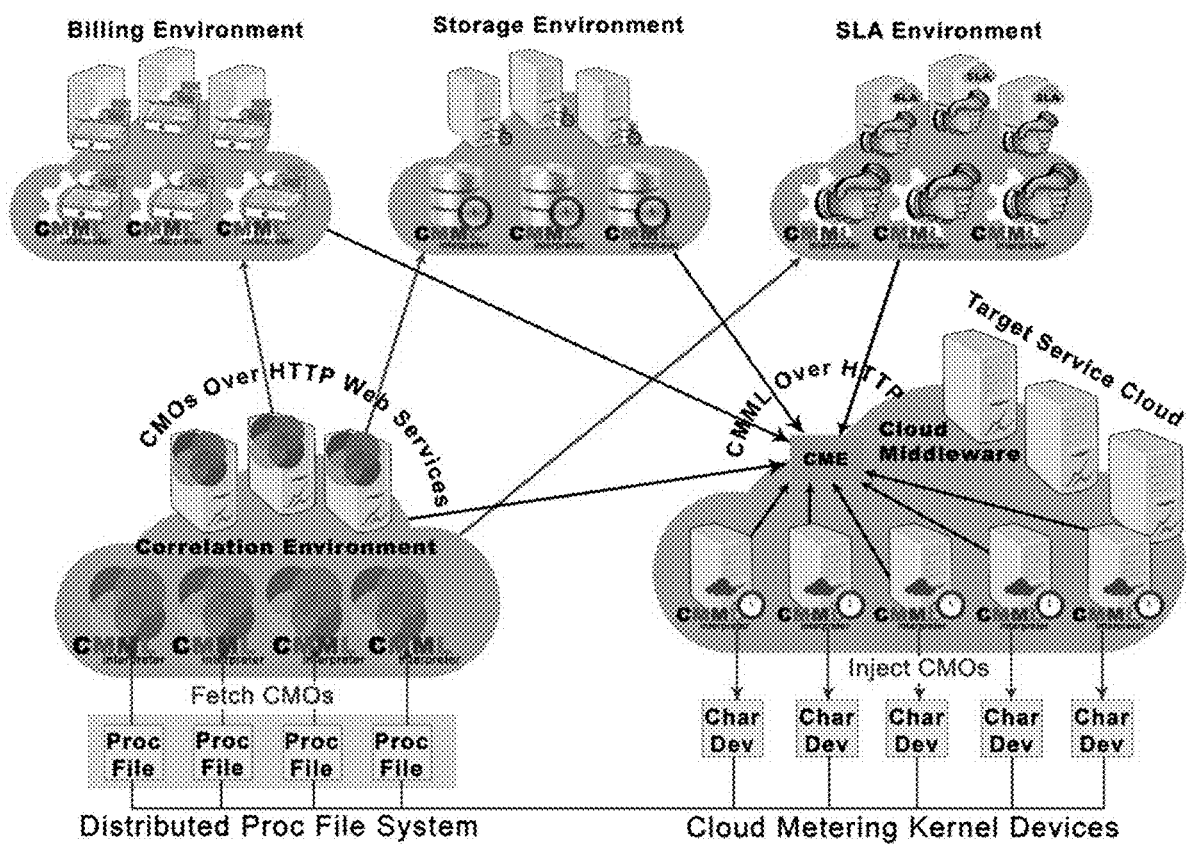
Figure 2C:
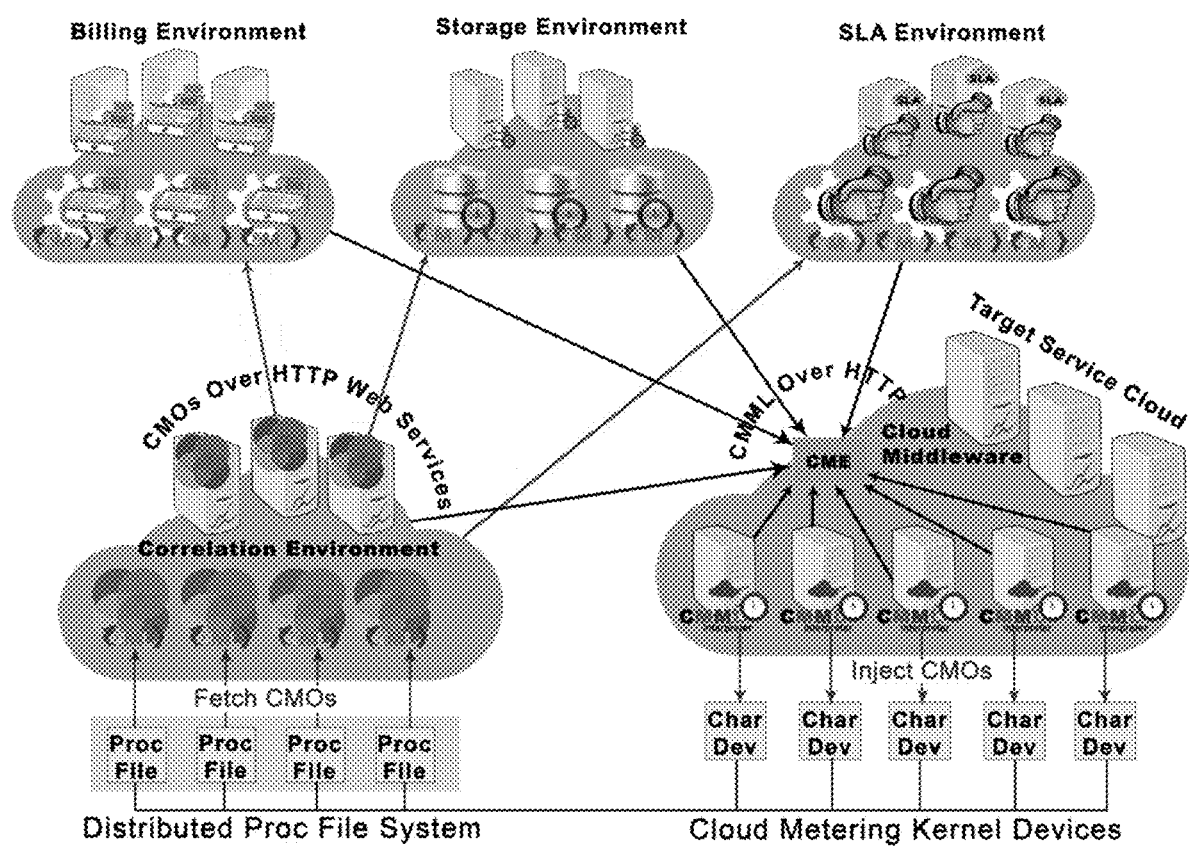

FIGS. 2A-C are block diagrams of example cloud metering systems. FIG. 2A shows a metering architecture template. FIG. 2B shows the metering architecture template annotated with example implementation details, including CMML and a distributed proc filesystem. FIG. 2C shows the metering architecture template annotated with different implementation details, including BOSML instead of CMML.

FIG. 2A shows a typical three-tier metering architecture. Log collection takes place in the front-tier, where metering data incompatibility is experienced and needs to be unified. Metering data collected from different sources are correlated in the middle-tier. Metering data storage, billing, and SLA monitoring are considered back-end metering services. Interaction with the target cloud management middleware is essential for the metering engines to be able to retrieve vital information about the cloud resources to be metered.

The metering process phases are log collection, unification, transportation, correlation, and back-end processing. Collection engines running on cloud service nodes extract and parse logs, and hence are the main source for probe effect. Data transport between collection engines and the correlation tier need to be optimized to reduce the probe effect on the cloud network resources.

Features of the Cloud Metering Framework

The complexity of consolidating cloud resource pools reflects on cloud metering. A resource can be a physical one such as CPU, RAM, disk, etc. or complex virtual resource built on top of more primitive resources. A resource can be a whole environment built up of virtual resources, such as virtual machines, networks, disks, etc. The target metering framework being sought should be able to provide metering perspectives at different levels of abstractions.

Normalization challenges, of hybrid metering data formats, increases with larger resource pools. Ability to correlate different resource usage with their different distributed running cloud applications is an even more insisting problem. Moreover, ability to collect metering data from cloud resources in a seamless and low overhead manner is another dimension of the problem, as it might affect the quality of the running cloud services.

The following points summarize the set of features and requirements in the target cloud metering framework:

1) Extensible Representation: Ease of interpretation and shareability between federated clouds.

2) Autonomous Metering Data: Coupling metering data with their corresponding operations.

3) Correlation Capabilities: Correlation of metering data extracted from different architectural layers.

4) Programmability: Flexibility of defining metering constructs through writing code.

5) Standard Metering Transport: Transporting metering data over simple standard APIs.

6) Elastic Multi-Tier Architecture: Can scale with the metering needs.

7) Metering Services Redundancy: The framework should allow the ease of executing redundant parallel metering tracks that can represent the needed infrastructure upon which fault tolerance mechanisms and solution can be constructed and implemented.

8) Online Metering: The over all End-To-End metering process should adopts a bubble up accumulative processing approach that process the metering data in different metering stages (collection, correlation, storage, billing, SLA, etc.) and provide the final results in a responsive time very close to real time.

9) Low Probe Effect: the running cloud services should be minimally affected in the worst case by the execution of the collection probes and the transport layer; hence low over head techniques of the collection engines as well as low overhead transport protocol and mechanisms should be adopted whenever the target cloud resources are involved; mainly between front and middle tiers.

10) Ease of integration: The framework instances should be easily integrated with cloud middleware as well as third-party systems. Thus extensible web services running on top of standard communication and application protocols should be adopted (e.g. REST/HTTP on top of TCP).

Metering Framework

The metering framework is based on an extensible metering markup modeling language coupled with a multi-tier scalable architecture. This document describes a set of specifications for cloud metering that act as guidelines and standards to build different cloud metering systems based on the target cloud environment.

The extensible object oriented Cloud Metering Markup Language (CMML) is proposed to represent metering data across the framework, through which the concept of autonomous Cloud Metering Objects (CMOs) can be realized. CMOs are autonomous, extensible objects that are self contained and mobile allowing for their migration smoothly and seamlessly. CMOs adopt object oriented representation and execute in a distributed object model that is based on service state migration where by serialization and deserialization mechanisms are adopted to move the objects over a cloud metering transport layer. Through the CMO concept, metering is performed via a modeling approach that not only models data but also models the operations to be executed on the data. In that sense CMOs are shareable objects that can be transferred between different environment and interpreted by different engines.

The adopted object oriented model is super imposed over an extensible markup data representation for maximum shareability. Metering data, represented by OO class data members, are coupled with their operations represented by OO class methods. The OO model is further extended with built-in receptors encapsulating routing information within the CMO to enable it to navigate between different framework engines autonomously using self contained information. The concept of CMOs eliminated the usage of passive metering data through operation definition annotations.

Figure 3:
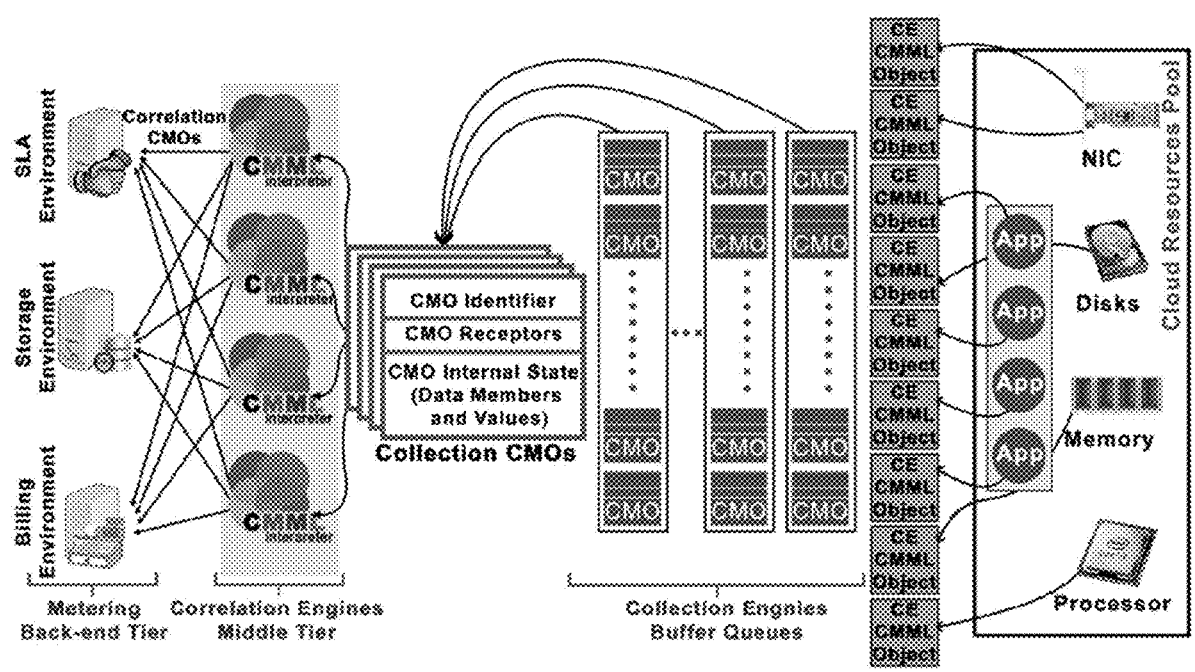
FIG. 3 is a block diagram illustrating example cloud metering objects.

FIG. 3 is a block diagram illustrating example cloud metering objects. A three-tier architecture is adopted, where each tier can be decomposed into sub-tiers based on the target functionality of the metering. FIG. 3 gives an overview of the whole metering framework architecture together with the main metering engines. The cloud environment is considered the metering framework front-end where the metering collection engines are deployed close to their target resources. The collection engines collect raw metering traces and convert them to collection CMOs. Correlation engines are deployed in the middle-tier where related CMOs are correlated and correlation CMOs are generated. The correlation CMOs are sent to the back-end services for further long term processing. All metering engines across the metering architecture should be able to interpret CMOs represented in CMML. Consequently, a CMML interpreter should be deployed to provide a vital living environment for CMOs.

One of the main roles of a cloud middleware is to maintain a resource inventory, and hence a cloud metering extension plug-in is expected to be integrated with the cloud middleware to generate metering CMML scripts, based on resource types and relations, to be downloaded and executed by different engines. The Cloud Metering Engine (CME) is a centralized service, and a metering extension to the cloud middleware, used by all metering engines as shown in FIG. 1.

CMML is a markup language with functional capabilities. A CMML tag is a construct that executes corresponding logic by a target CMML interpreter. Two mandatory tags need to exist in a CMML script, namely CMMLScript and CMMLMain. The CMMLScript tag encloses the whole script body, and the CMMLMain tag identifies the main entry point for the script execution. A CMML tag can be invoked by name via its "Name" sub-tag. The CMMLRoutine tag is used to defined routines to support modular programming. Concurrency is built at the core of the language. The "Thread" tag is used to activate tags execution as threads, and can define threads affinity configuration upon needs.

Example Set Notation

The following section sets forth an example set notation coupled with regular expressions to define syntactical aspects of the language. The example set notation can be used, for example, to guide a development team to build a CMML interpreter to be compliant with the syntax and the semantics of the language.

Let us first define some primitive sets that we will use in our representation.

Listing 5.21: Primitive Sets
lc=[a z] The set of all lower case characters
uc=['A Z] The set of all upper case characters
dig=[0 9] The set of all digits
pascii=['"~'] The set of all printable ASCII character from ASCII(32) to ASCII (126)

CMML has a basic set of predefined CMML tags, which are the minimum set of tags and tag values that need to be supported for a CMML script to be able to execute correctly.

Listing 5.22: Predefined CMML Tags
CMMLScriptTag={"CMMLScript"}
CMMLMainTag={"CMMLMain"}
CMMLReservedTags={"CMMLRoutine","CMMLInclude","CMMLRemoteInclude", "CMMLClass","CMMLObject", "Exec"}
CMMLInternalTags={"Subject","Value","Name"}
DataTypes={integer,boolean,double,float,long,string,CMMLObject,numeric}
Visibility={Public,Private}
Boolean={True, False}

A CMML Script is defined based on CMML tags that enclose both data and operational logic. A CMML tag is a tag whose name should start with "CMML" and is a maximum of 80 characters. A CMML tag has the following formal definition.

Listing 5.23: CMML Service Tag Name
CSTN: CMML Service Tag Name
CSTN={s|s is a string such that
s $\in$ "CMML"(lc|uc)n and n>0 and n<=76
and s $\notin$ CMMLScriptTag $\cup$ CMMLMainTag $\cup$ CMMLReservedTags}

For the sake of simplicity and encapsulation, we will define a set of functions that return sets of entities that we will refer to in our subsequent definitions.

Listing 5.24: Set Functions
MethodNames($\beta$)=The set of method names of the CMML Object $\beta$ or CMML Class $\beta$ based on the context
MethodParameters($\beta,\delta$)=The set of parameter names of the method $\delta$ of the CMML Object $\beta$ or CMML Class $\beta$ based on the context
DataMembers($\beta$)=The set of data member names of the CMML Object $\beta$ or CMML Class $\beta$ based on the context We then define the sets of tags following common patterns and that we will refer to in the definition of more complex tags.

Listing 5.25: CMML Different Tag Types Definitions
GT: General Tag
GT={s|s is a string such that s $\in$(lc|uc)n where n>0 and n<=80}
STR: Simple Tag Record
STR={s|s is a string such that s $\in$"<"$\beta$">"pascii+"</"$\beta$">" and 8 E GT}

CTR: Composite Tag Record

CTR={s|s is a string such that s $\in$"<"$\beta$"><Name>"$\delta$"</Name>"(CTR|STR)$^+$"</"$\beta$">"

and $\beta \in$ GT and $\delta \notin$ TagNames, and $\delta$ will be added to TagNames after successful declaration}

CSR: CMML Service Record

CSR={s|s is a string such that s $\in$"<"$\beta$">"(STR|CTR)$^+$ "</"$\beta$">" and $\beta \in$ CSTN}

The CMML language is an extendable language in the sense that it can be extended by adding new tags to it. Within our scope we will not be able to define each and every CMML tag currently in the language as they follow the operational definition behind the need of their functionality; a tag is added for a specific functionality whose need arises due to its absence. So a special set notation definition can be constructed as per CMML tag, but the most important matter is that it needs to be a subset of the general definition of the CSR tag defined above; CMML Service Record. For that, we will choose a set of complex fundamental CMML tags and present their set notation specification, and other CMML tag definitions can follow the same line of definition.

The Exec Tag:

The Exec tag is a special fundamental tag that is used to invoke any tag that is declared in the current CMML Script by name.

Listing 5.26: CMML Exec Tag

Exec={s|s is a string where
s $\in$"<Exec>"($\beta$|CSR)"</Exec>" and $\beta \in$ TagNames}

The CMMLMain Tag: The CMMLMain tag is located inside the CMMLScipt tag only once and it designates the starting point of execution of the script.

Listing 5.27: CMML Main Record

CMR: CMML Main Record

CMR={s|s is a string such that s $\in$"<"/$\beta$">"(CSR $\cup$ EXEC)* "</"$\beta$">"

and $\beta \in$ CMMLMainTag}

The CMMLScript Tag: The CMMLScript tag is the main tag that defines a CMML script and it encloses all the CMML tags in the CMML script. It essentially needs the CMMLMain tag to be defined some where to designate the starting point of the execution of the program.

Listing 5.28: CMML Script Record

CSCR: CMML Script Record

CSCR={s|s is a string where s $\in$"<"$\beta$">"(CSR|CMML-Class)* CMR "</"$\beta$">" and $\beta \in$ CMMLScriptTag}

The CMMLClass Tag: The CMMLClass tag is the most complex tag in the language as it defines an object oriented class. The CMMLClass tag encloses all the class definitions including data members, methods, and metering constructs.

Listing 5.29: CMMLClass tag Definition

```
CMMLClass = { s | s is a string such that
s ∈ "<CMMLClass>
<Name>"σ"</Name>"
(ε |"<FlattenedName>"μ"</FlattenedName>")
"<DataMembers>"
(ε |"<DataMember>"
"<Name>"δ"</Name>"
<Visibility>"β"</Visibility>"
<Type>"κ"</Type>"
"<Exportable>"λ"</Exportable>"
"<Sync>"ζ"</Sync>"
"<Billing>"ζ"</Billing>"
"<SLA>"ζ"</SLA>"
"<Size>"dig+"</Size>"
(ε |"<FetchScopes>"
("<FetchScope>"pascii+"</FetchScope>")+
</FetchScopes>")*)*
"</DataMembers>"
"<Collect>"(CSR ∪ Exec)*"</Collect>"
"<Correlate>"(CSR ∪ Exec)*"</Correlate>"
"<Bill>"(CSR ∪ Exec)*"</Bill>"
"<SLA>"(CSR ∪ Exec)*"</SLA>"
"<Methods>"
("<Method>"
"<Name>"ω"</Name>"
(ε | "<Parameters>"
("<Parameter>
<Name>"φ"</Name>
<Type>"ζ"</Type>
</Parameter>")+
"</Parameters>")
"<Body>"
"<CMML>"(CSR ∪ Exec)*"</CMML>"
"</Body>"
"</Method>")*
"</Methods>"
"</CMMLClass>"
and σ ∈ pascii+ and σ ∉ TagNames
and μ ∈ pascii+ and μ ∉ TagNames ∪ {σ}
and δ ∈ pascii+ and δ ∉ DataMembers(σ)
and β ∈ Visibility and κ ∈ DataTypes
and λ ∈ Boolean and ζ ∈ Boolean
and δ ∈ pascii+ and δ ∉ DataMembers(σ)
and ω ∈ pascii+ and ω ∉ MethodNames(σ)
and φ ∈ pascii+ and φ ∉ MethodParameters(σ,ω)
and ζ ∈ DataTypes}
```

The CMMLExecuteMethod Tag: The CMMLExecuteMethodTag is responsible for invoking a method from an instantiated object in the runtime environment of the current script.

Listing 5.30: CMMLExecuteMethod Tag Definition

```
CMMLExecuteMethod = { s | s is a string where
s ∈ "<CMMLExecuteMethod>
<CMMLObject>"pascii+"</CMMLObject>
<CMMLObjectMethod>"pascii+"</CMMLObjectMethod>"
( ε | "<Parameters>"
("<Parameter>
<Name>"pascii+"</Name>
<Value>"pascii+"</Value>
</Parameter>")*
"</Parameters>")
"</CMMLExecuteMethod>" }
```

The rest of the tags can be derived from using the same set notation scheme.

The BOSML language can be derived from the set notation specifications by replacing the "CMML" prefix token in all the set derivation rules with the prefix token "BOSML". This can be applied generically with any language other future extension language that preserve the same characteristics of the main CMML language to solve other problems than metering, for example, an extensible markup distributed object oriented executional language. Conventional programming languages lack the combination of all of these characteristics.

Example Scripts

Listing 1 presents a "Hello World" CMML Script that demonstrates the basic features of the language. This script should print "Hello World" twice, through invoking the CMMLRoutine and the CMMLOut tag by name. Notice that the two "Exec" calls will run in parallel as the routine thread tag has the "Thread" sub-tag enabled.

```
<CMMLScript>
    <CMMLRoutine>
        <Name>PRINT HELLO WORLD</Name>
        <Thread>TRUE</Thread>
        <CMMLOut>
            <Name>HELLO WORLD</Name>
            <Subject>Hello World !!</Subject>
            <Target>
                <PipeTo>STDOUT</PipeTo>
            </Target>
        </CMMLOut>
    </CMMLRoutine>
    <CMMLMain>
        <Exec>PRINT HELLO WORLD</Exec>
        <Exec>HELLO WORLD</Exec>
    </CMMLMain>
</CMMLScript>
```

Listing 1: CMML Hello World Script

The CMML language supports object oriented capabilities. Listing 2 shows a simplified CMML class definition for collecting VM CPU data. Each class has a name, set of data members, and set of methods. The CMML object model is extended to support metering constructs. A set of tags are defined in the class definition to hold CMML logic that can execute at different stages of the metering processing, namely "Collect", "Correlate", "Bill", and "SLA". Each tag is executed by a metering engine based on the location of the CMO at the time of execution. Each CMML object can be executed as a thread through invoking the built-in predefined implicit method "start" which invokes the CMML class "Collect" tag, implicitly.

```
<CMMLClass>
    <Name>VMCPUStat</Name>
    <DataMembers>
        <DataMember>
            <Name>VMName</Name>
            <Visibility>PRIVATE</Visibility>
            <Type>string</Type>
            <Exportable>true</Exportable>
        </DataMember>
        <DataMember>
            <Name>cpustat</Name>
            <Visibility>PRIVATE</Visibility>
            <Type>integer</Type>
            <Exportable>true</Exportable>
        </DataMember>
    <DataMembers>
    <Collect>
        <NextCollectionDelay>2</NextCollectionDelay> <!-- Sleep 2 Seconds -->
        <Iterations>0</Iterations> <!-- Runs for ever-->
        .......
        <CMMLObjectXMLalize>
            <CMMLObject>this</CMMLObject>
            <RedirectTo>
                <PipeTo>FILE</PipeTo>
                <PipeName>/dev/CloudMeterDev0</PipeName>
            </RedirectTo>
        </CMMLObjectXMLalize>
    </Collect>
    <Correlate> ..... </Correlate>
    <Billing> ..... </Billing>
    <SLA>.....</SLA>
    <Methods>
        .....
        <Method>
            <Name>GetCPUStats</Name>
            <Body>
                <CMML>.....</CMML>
            </Body>
        </Method>
    </Methods>
</CMMLClass>
```

Listing 2: VMCPUStat Class Definition

The CMML Object Model is extended to a Distributed Object Model based on service state migration. Special CMML built-in serialization tags are supported, namely "CMMLObjectXMALalize" and "CMMLObjectCMMLalize". The adopted mode of operation is that CMOs are suspended and serialized via the "CMMLObjectXMALalize" tag, as in listing 2, sent over the network to another metering engine, restarted into the destination CMML runtime environment via "CMMLObjectCMMLalize", and resumed via the CMML tag corresponding to the destination.

Transport Layer

The framework specifications mandate that the communication between the collection engines and the middle-tier should be carried out over standard filesystem I/O operations. Collection engines runs on cloud nodes with diversified specifications and a simple and primitive data transfer mechanism available on most operating systems is needed. This will give the implementation freedom for the transport layer to range from a simple file transfer to a sophisticated distributed filesystem.

A REST/HTTP web service protocol is adopted between the correlation engines and the back-end services, as well as between the framework engines and services deployed outside the framework. This allows for a standardized communication, and decouples the metering services execution from the communication operations. The REST protocol is a very primitive web service protocol that gives a lot of implementation flexibility and provides the freedom of superimposing more complex protocols like SOAP, or XMLRPC based on the needs.

Metering Engines

Collection engines instantiate objects of classes downloaded from the CME and represent resources to be metered. The "Collect" Tag enclosing the data collection logic is invoked in detached threads. As per listing 2, the The "NextCollectionDelay" represents the inter-collect-gap in seconds between every execution of the "Collect" tag body. The "Iterations" define the number of times the "Collect" tag body should be executed before the CMML object thread terminates, with zero indicating an endless run. The "Collect" tag logic should perform collection, preprocessing, CMO serialization, and injection into the transport layer.

The CMML classes are downloaded from the CME and instantiated by the correlation server CML runtime environment. All resource classes are aggregated into wrapper objects that group related resources. The correlation engines read serialized CMOs via filesystem I/O operations. The receptors of each CMO is extracted and the target correlation engine CMML objects are identified. The CMO is then deserialized, started, and passed to the target correlation engine objects as a parameter upon invoking the "Correlate" tag. After correlating all CMOs, the resulting Correlation CMOs are sent to the back-end services over REST/HTTP. The correlation tier can be decomposed into hierarchical sub-tiers where by different processing stages can be defined and established to represent different correlation abstraction layers, and hence different metering perspectives.

Correlation engines perform Data and time correlation. Based on the CMOs receptor definitions, related CMOs are grouped and data correlation is achieved. The time correlation is based on the existence of a virtual clock across the framework, and the mechanism for implementing it is left to be decided on at implementation time. The following are two time related correlation mechanisms adopted by the framework specifications.

Adhoc Correlation: CMOs are considered related if they arrive at the correlation engine in the same time frame. This mode of operation is very light weight and does not need a lot of metering computing resources. This mode should only be used when commutative usage evaluation is needed, or when monitoring specific thresholds of the cloud services usage.

Epoch-Based Correlation: CMOs are timestamped grouped in time epochs with preconfigured length. CMOs belonging to the same time epoch are correlated together and the resulting correlation CMOs are stamped by the start and end timestamps of the epoch. A crucial performance problem is encountered when the rate of collection CMOs is higher than the processing rate. This might hinder the stability and the responsiveness of the correlation environment, and consequently two runtime configurations are constructed to overcome this situation:

1: Exact: The correlation process is terminated if it exceeds the duration of the corresponding epoch. This case can be used if the CMOs represent commutative metering and detailed break down of the metering indicators is not important, e.g. CPU time from the proc filesystem which represents the time of a process since it started.

2: Adaptive: A feedback mechanism between the correlation engines and the CME should be in place for reporting the percentage of CMOs processed post the correlation duration. The CME should automatically change the inter-collect-gaps represented by the "NextCollectionDelay" at runtime to reduce the CMOs generation rate. This process should be performed iteratively until equilibrium is reached.

The storage engines are back-end services deployed on storage servers. A storage server receives its corresponding storage engine definitions from the CME. The storage servers receive correlation CMOs and store them into corresponding storage engines based on the receptors definition.

The billing engines are back-end services deployed on billing servers. A billing server receives correlation CMOs based on their receptors and execute the logic enclosed in their "Bill" tag. The billing operations generate billing CMOs that are stored in special billing storage engines.

The SLA engines are back-end services deployed on SLA servers. A

SLA server receives correlation CMOs based on their receptors and execute the logic enclosed in their "SLA" tag, which should contain actions that need to be executed based on usage threshold that are represented by the CMO data members.

The back-end services illustrated are presented for purposes of illustration. The systems can include more or fewer back-end services based on the metering requirements of the system. The scalable power of the framework specifications allows adding special tags for each newly introduced back-end service to enclose the logic that will be executed on its corresponding engine.

Example Metering Framework Prototype

A prototype is presented in this section to demonstrate the applicability of the proposed framework. The presented prototype is just one possible implementation of the framework, and others can be achieved following the framework specifications.

Prototype Components

CMML Interpreter

A CMML interpreter is built on top of an extendable C++ framework. The abstract class CMMLService needs to be inherited by each CMML tag class. The CMMLService encapsulates all the threading and common functionalities needed by a CMML tag, and the CMML tag implementation includes only the business logic. Each CMML tag is compiled into a dynamic shared loadable module which has specific interfaces to be invoked by the interpreter.

Distributed Proc Filesystem The proposed transport layer is based mainly on extending the UNIX proc filesystem for communication between the front and middle tiers. The transport layer prototype is implemented under LINUX OS, yet the concept adopted can apply to any standard UNIX environment. The transport layer adopts a client/server communication model. Collection engines are at the server side and the correlation nodes are the clients. The cloud service nodes and the cloud virtual machines deploy a character device kernel module extension used as a filesystem interface for collection engines to inject their serialized CMOs. The character devices act as a kernel buffer queue for CMOs to be transported over the network.

The cloud metering correlation nodes host the transport layer client side which is a proc filesystem kernel module extension. Two proc directories are created, one for physical nodes and the other for virtual machines. Character devices can register on one or more correlation nodes. Upon registering, the kernel extension creates a proc file entry under one of the two folders based on the type of the node. The proc file entry is named using the node network address.

Figure 4:
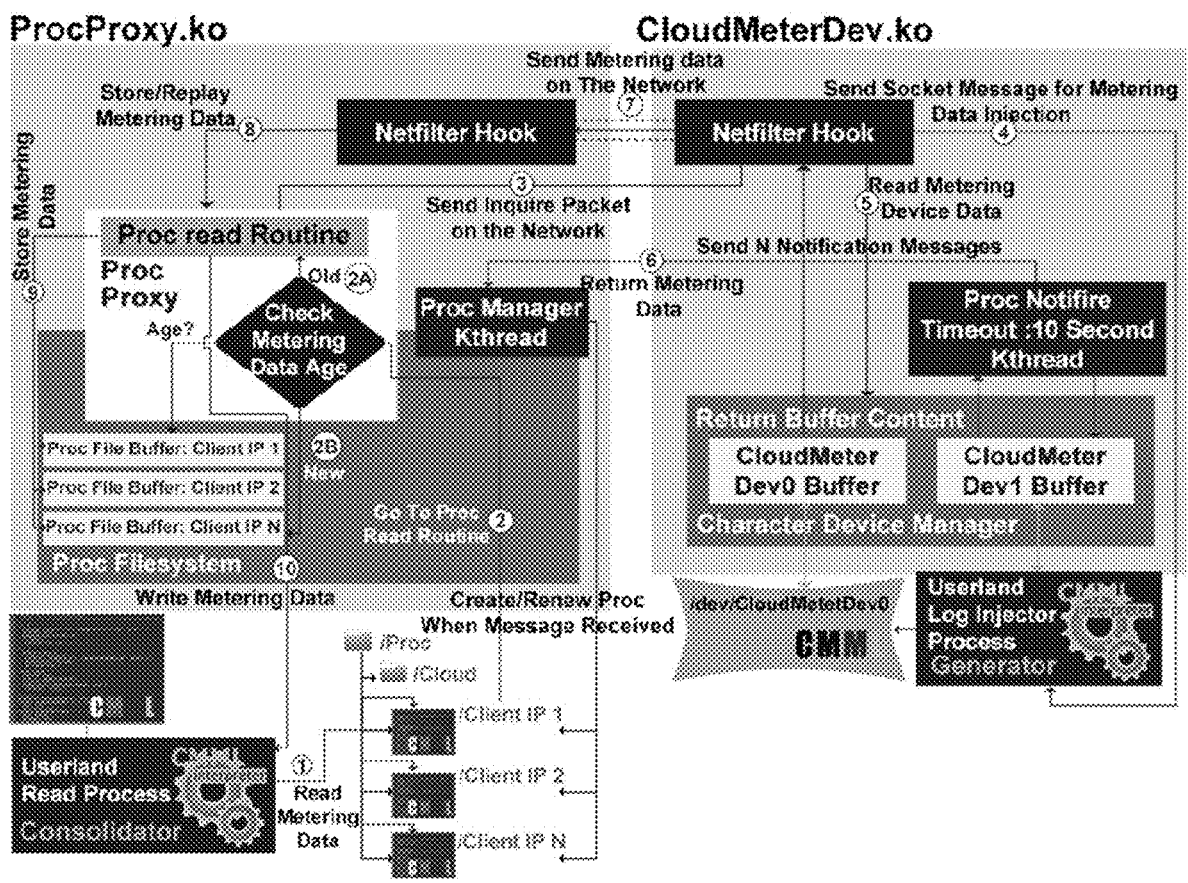
FIG. 4 is a block diagram of an example collection process implemented using a proc filesystem.

Upon reading a proc file entry the content of the corresponding character device is transferred over network. Both kernel modules have a netfilter hook activated which handles the communication which is based on packet reorder and group packets acknowledgement. This allows the correlation nodes to read metering data transparently through standard POSIX filesystem I/O operations. The whole communication transport layer resides inside the kernel space. Overheads are being avoided through intercepting the network packets at the IP network layer 3. FIG. 4 illustrates the transport workflow.

Figure 5:
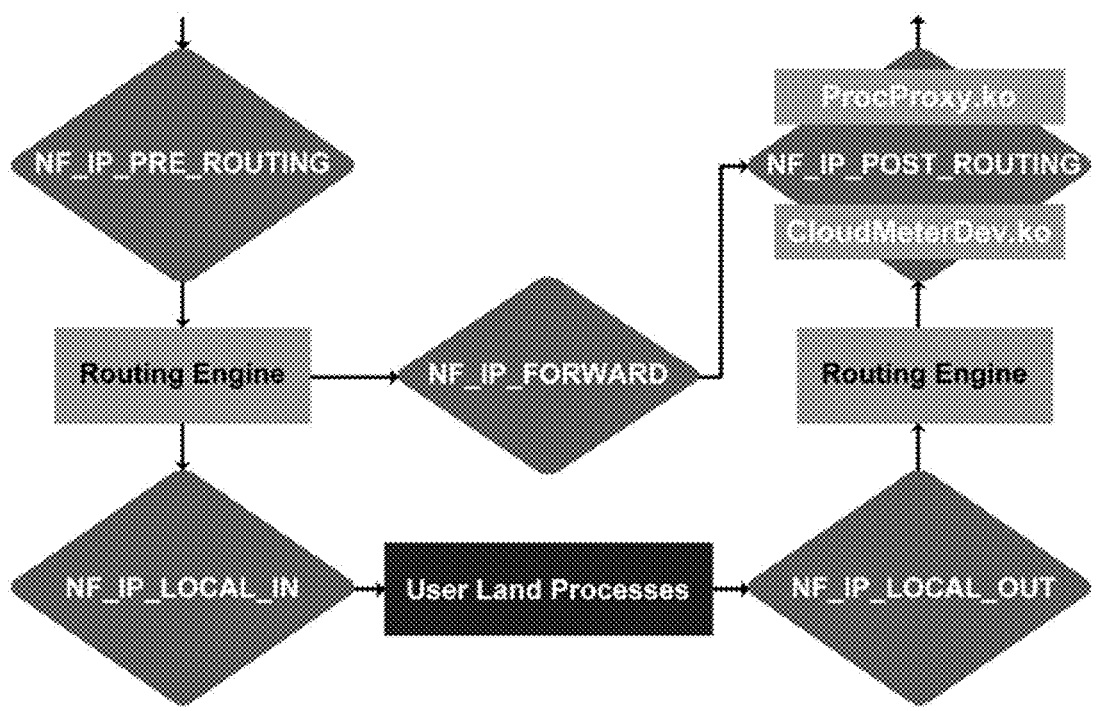
FIG. 5 is a block diagram illustrating an example process for transporting collected resource usage data using netfilter hooks.

Netfilter hooks extension mechanism for the Linux Kernel built-in firewall, allows for adding custom code for packet interception, inspection, and manipulation. FIG. 5 shows the five main available hooks that are located at different stages of packet processing for adding custom code. Request and reply packets will be intercepted based on the port numbers in the IN_IP_PRE_ROUTING stage. There are no userland processes acquiring the interception ports, and hence such ports are considered pseudo ports for packet identification by the netfilter hooks. This will decrease the communication overhead, and will ease the network operation and packets manipulation within the kernel space.

The biggest challenge in using netfilter hooks can be that the hooked code is invoked by an interrupt, during which network I/O operations are disallowed. Consequently, kernel work queues are used for deferred I/O task execution. Although this mechanism solves the problem, yet it imposes synchronization complexity where the main thread of execution will not be aware when the I/O operation is finished.

Cloudsparc: Cloud Management Middleware

Cloudsparc is an example IaaS cloud management middleware built on top of an extendable C++ framework.

Cloudsparc supports hybrid hypervisor technologies, namely QEMU/KVM, Oracle VirtualBox, and VMWare VMPlayer. Cloudsparc manages a cluster of physical nodes representing the cloud resources pool. Cloudsparc nodes are either master or slave. Master nodes are responsible of managing the cloud configuration, maintain resources inventory, manage slave nodes, and run cloud services in the form of virtual machines. Slave nodes are responsible only for running cloud services.

A VM template manager is available allowing the creation of VM Profiles with different virtual machine specifications for streamlining the creation and the dispatching of VMs. Cloudsparc is designed to provide control over virtual machine dispatching, ranging from fully automated virtual machine scheduling to the ability of assigning specific virtual machines to specific physical nodes. Cloudsparc allows creating virtual architectures designed for building perspectives of the available resources. A virtual architecture is a grouping mechanism that allows grouping multiple VM profiles and all their dispatched virtual machines can be seen as one processing unit irrespective of their locations.

Cloud Metering Extension

Cloudsparc is extended to support metering through the integration of a CME plugin built up of three main extensions:

Cloudsparc Inventory Extension: The resources inventory is extended for adding definitions of correlation, storage, billing, and SLA servers. Different resource usage price lists and threshold limits can be defined and linked to billing and SLA engines respectively.

Cloudsparc Metering Plugins: The VM Profile is extended to include a metering plugin data structure. A metering plugin is designed to meter a specific cloud resource, e.g. CPU, Memory, I/O, Network usage, or even an application. Correlation engines responsible, are defined in the metering plugin, as well as storage engines responsible for storing raw CMOs, if needed. Metering plugins are designed to run on physical nodes as well as from within a virtual machine.

correlation plugins. Metering domes can group different correlation plugins which provides a second level aggregated metering perspective. Correlation plugins are designed to correlate metering data coming from virtual machines which belong to either a virtual architecture or a VM profile.

As per the diagram in FIG. 2 the CME is a centralized service maintained by the cloud middleware and having access to the cloud resources inventory, relation between different resources, and metering configurations to be applied. The CME is invoked by all metering engines upon their startup to download corresponding CMML metering scripts, and periodically during their execution to check for updates and changes in metering configuration. A set of CMML template classes designed to meter different resources are used by the CME to generate CMML scripts on the fly upon metering engine invocations. The CME is also responsible for providing time information via a modified version of Berkeley's Algorithm to establish a distributed common virtual clock.

The collection engine starts with a seeder CMML script as in listing 3 to connect and download the metering CMML script from the CME. The powerful tag, CMMLRemoteInclude, is used to initiate a REST/HTTP request to the CME with parameters identifying the nature of the request. The CME identifies the invoking collection engine from the network connection parameters, and the "SECONDARY ACTION" parameter, and prepares the corresponding CMML script based on its inventory and the metering configuration. The generated CMML script is loaded instantly into the interpreter runtime environment. The generated CMML classes are responsible for metering the resources on the corresponding node, either physical or virtual. The downloaded CMML script contains CMML constructs to start the collection engine's character devices loadable module. The character device registers itself on one or more correlation server's distributed proc file system, based on the CMML script, for fault tolerance purposes.

```
<CMMLRemoteInclude>
    <Server>[#CME_IP_ADDRESS#]</Server>
    <Port>9999</Port>
    <Method>POST</Method>
    <ServiceName>/FetchMeteringCMMLScript.cgi</ServiceName>
    <Fields>
        <xml_request>
            <Cloud>
                <FetchMeteringCMMLScript>
                    <Action>CUSTOM</Action>
                    <SECONDARY_ACTION>COLLECTION_ENGINE</SECONDARY_ACTION>
                </FetchMeteringCMMLScript>
            </Cloud>
        </xml_request>
        <response_mode>TransactionResponse</response_mode>
        <UNAME>metering</UNAME>
        <PASS>metering</PASS>
        <LOGIN>Login</LOGIN>
    </Fields>
</CMMLRemoteInclude>
```

Cloudsparc Correlation Plugins: A correlation plugin defines a correlation engine and the correlation server it should reside on. Storage, Billing, SLA severs, price lists, and SLA thresholds are defined for processing correlation CMOs. Redundant definition of back-end servers is adopted to achieve redundant metering processing paths, where by the needed infrastructure for fault tolerance is established. Two types of correlation plugins are available, namely metering domes and Listing. 3: CMML Collection Engine Seeder The collection engine instantiates one or more objects from each CMML class to run in detached threads. The CMML objects will continue to inject collected serialized CMOs to a synchronized managed shared buffer through executing the CMML code enclosed in the "Collect" tag. A special shared buffer manager is designed to watch the size of the buffer, and upon reaching a pre-configured size, referred to as the queue size, the buffer manager will add Time To Live (TTL) information to the buffer content and inject the CMOs into the distributed proc filesystem character device. The TTL information is used by the correlation engines to calculate the time of the next read.

The correlation engines, started via seeder CMML scripts, invoke the CME to retrieve relationship information between different resources, and instantiate aggregate CMML objects accordingly. The correlation engines probe their proc filesystem periodically based on the TTL information returned in the CMML streams. Different CMML objects are deserialized, restarted, and undergo correlation processing, based on their receptors, and through invoking the "Correlate" tag. The resulting correlation CMOs are submitted to the back-end tier over web services. A typical correlation server deployed CMML interpreter would use the CMML presented in listing 4 for continuous correlation.

```
<CMMLObjectCorrelate>
    <Name>CorrelationManager</Name>
    <CreateAhead>1</CreateAhead>
    <Subject>
        <CMMLFetchDirContent>
            <Name>metering_proc_fetcher</Name>
            <Directory>/proc/cloud/</Directory>
            <Directory>/proc/vcloud/</Directory>
            <ReadSize>204800</ReadSize>
            <CreateAhead>1</CreateAhead>
            <HuffmanCompressed>true</HuffmanCompressed>
            <LogFile>correlation</LogFile>
            <CacheSize>104857600</CacheSize>
            <SleepInterval>1</SleepInterval>
        </CMMLFetchDirContent>
    </Subject>
    <GracePeriod>2</GracePeriod>
    <Slicing>
        <Duration>30</Duration>
        <Slices>6</Slices>
        <Method>Adaptive</Method>
        <FeedbackIP>192.168.1.20</FeedbackIP>
    </Slicing>
</CMMLObjectCorrelate>
```

Listing 4: CMML Correlation Engine

The CMMLFetchDirContent is a CMML tag designed to run in a detached thread. Upon first invocation of the tag the thread is created and detached, and continuously monitors the provided filesystem directories in the "Directory" tag for new data, which is stored in the tag internal buffer. TTL information is utilized for better utilization of the underlying filesystem. On subsequent invocations the tag returns its internal buffer to the invoker and flushes it. The CMMLObjectCorrelat tag is a CMML tag responsible for CMO correlation. The tag is designed to execute as a thread to continuously correlate incoming CMOs into its "Subject" tag. The Subject tag encloses the invocation of the CMMLFetchDirContent to fetch new CMOs. The GracePeriod tag defines a sleep duration in seconds between every correlation attempt. The correlation mode can be configured using the composite "Slicing" tag.

Resulting Correlation CMOs are forwarded to the different back-end services based on their receptor configurations. The storage engines will store the correlation as well as the collection CMOs. The billing engine will execute the "Bill" method represented by the "Bill" tag enclosing the billing logic to generate and store bills. The same applies for the "SLA" tag with the capability to take actions upon SLA violations such as CPU capping and network bandwidth reduction.

The model allows for dealing with autonomous CMOs that encapsulate data and operations, rather than collecting metering data and deciding on the metering operation in a later stage. Moreover, the framework is capable of metering cloud resources at various levels of abstractions with ease through the flexibility of writing code, which reflects on high levels of programmability and extensibility.

Example Online Shop Application

This section presents the metering of an online shop application as a case study to demonstrate the metering capabilities of the framework and the ease of integration with an already existing application. The application was designed and implemented without having cloud deployment and metering in its requirement specifications. A new requirement is introduced, which is charging the shop's customers for the computing resources they use while they are performing their purchase transactions.

The online shop provides a categorized products menu. An online user needs to register on the website and provide personal details for verification in order to make purchases. A shopping cart engine is integrated into the system allowing users to select their products, add them to their shopping cart, and check out after reviewing the list of products in their shopping cart together with the price details and totals.

The online shop web application is based on open source technology. The application is written in PHP and deployed on an Apache web server. The back-end database MySQL is used to store the online shop data, as well as the Content Management System (CMS) configuration. The application is designed with scalability in mind, where the application can be deployed on a horizontal cascaded Apache web server farm. The back-end database can be configured using MySQL Replication cluster to enhance performance through load distribution.

The online shop is deployed on 5 virtual architectures, each representing a shop branch. Each shop branch environment has 4 virtual machines acting as an Apache web server farm, 1 virtual machine acting as a web traffic dispatcher to distribute the load over the Apache web servers, and 1 virtual machine acting as a back-end database. The 5 backend database machines of the 5 branches are configured using MySQL Master/Master Replication. The diagram in FIG. 6 best describes the cloud deployment environment of the case study.

Figure 6:
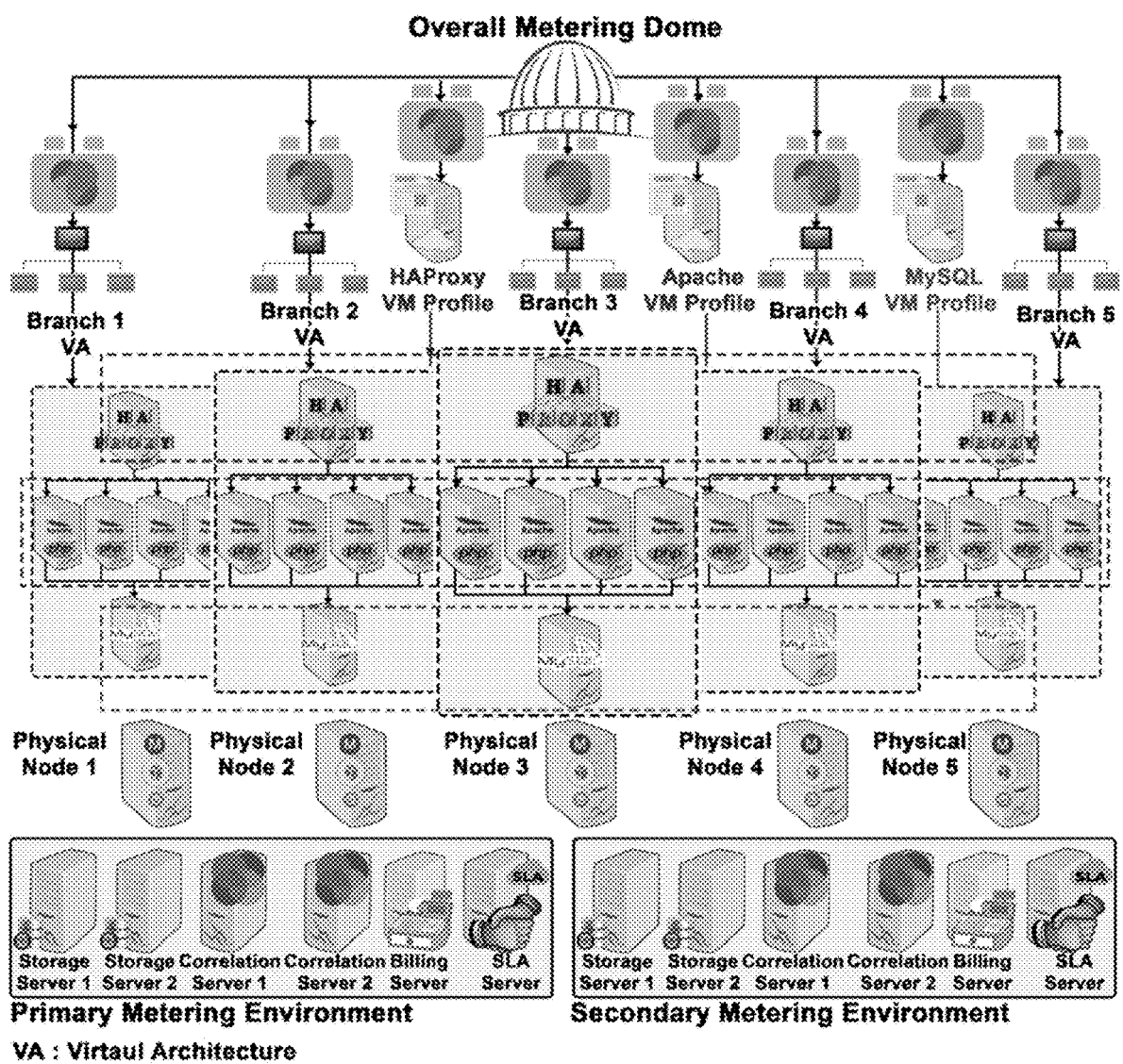
FIG. 6 is a block diagram of an example cloud metering environment.

Each virtual machine follows a VM Profile. Four physical metering plugins are defined to meter the virtual machine resources, and another four virtual metering plugins are defined for metering the different services based on the VM Profile type, namely Apache, HAProxy, and MySQL. A metering plugin for metering the usage of the online shop application is defined for the Apache VM profile. The metered resources are CPU, RAM, I/O, and network. FIG. 6 is a block diagram of the example cloud metering environment.

Five correlation plugins are defined to monitor the resources of the five shop branches, by assigning the correlation plugins to the shops' virtual architectures. Another three correlation plugins are defined to monitor the different online shop services by assigning each correlation plugin to a VM Profile. Finally, a metering dome is defined to include and aggregate the usage of the 5 shop correlation plugins to provide the perspective of the overall online shop.

The middle and the back-end tiers of the metering environment are deployed on dedicated virtual machines. The metering engines are distributed over two correlation, two storage, one billing, and one SLA servers. FIG. 6 shows the redundant metering environment represented by the primary and the secondary set of resources to establish the prerequisite infrastructure for fault-tolerance.

Online Shop Metering Extension

Metering data needs to be presented in different perspectives and abstraction levels, namely data center, service provider, and online shop user usage. Consequently, new metering plugins need to be defined and limited amendments, to the online shop web application, need to be carried out.

Figure 7:
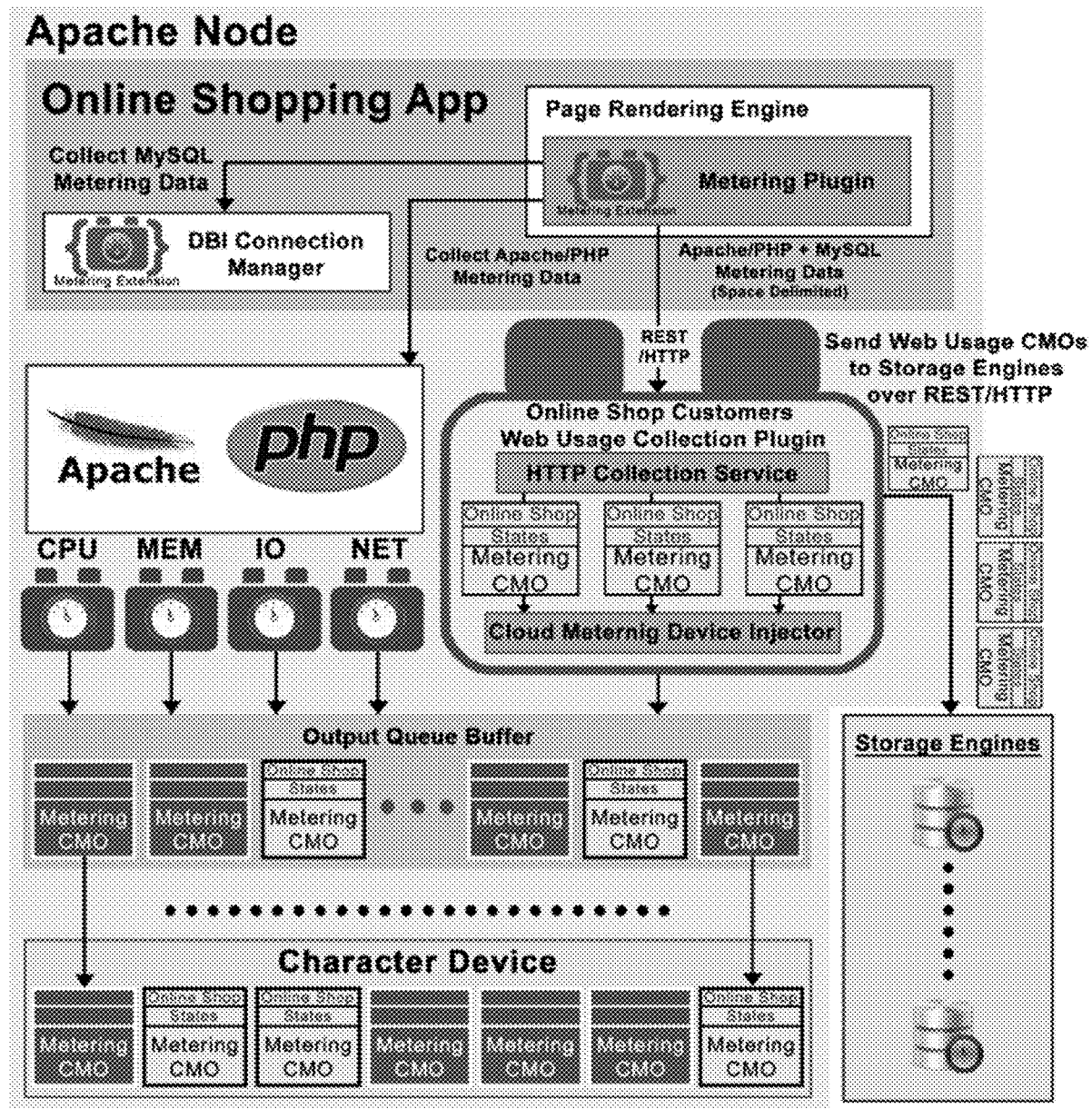
FIG. 7 is a block diagram of an example cloud computing node.

A metering plugin is defined in the Apache VM profile to collect metering data from the online web application as per user transaction. The diagram in FIG. 7 shows the details of the Apache VM collection engine details. Four virtual metering plugins are deployed in each Apache virtual machine to collect CPU, Memory, I/O, and Network usage. The magnified web application metering plugin acts as a web server receiving usage indicators in white-space delimited format over REST/HTTP. The metering data is parsed and loaded into the internal state data members of the plugin CMML object.

The web application CMOs are periodically serialized and injected into the collection engine shared buffer to be integrated with the over all metering model. The CMOs are also submitted to a special temporary billing storage engine for the shopping cart to present the user with the corresponding bill at checkout within the same session, avoiding the need to wait for the correlation process to finish.

Figure 8:
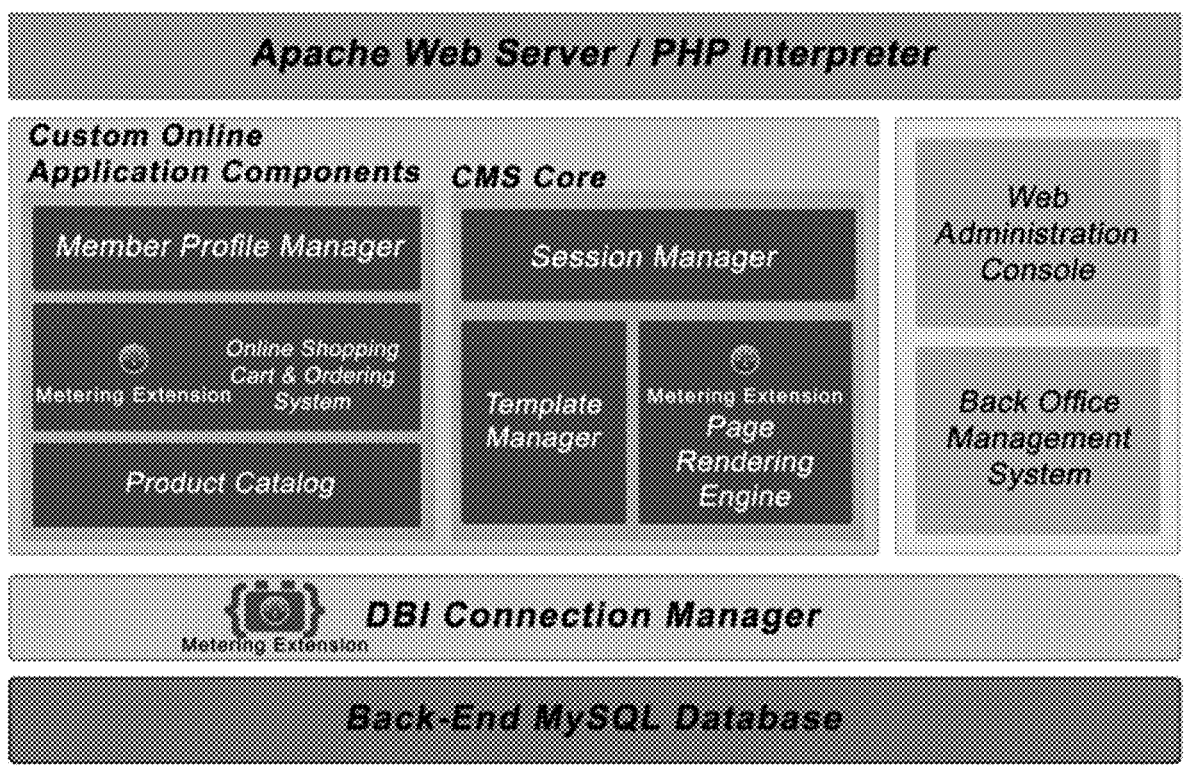
FIG. 8 is a block diagram of an example application executing on a cloud computing system.

The web application needs to generate usage data and post it to the metering plugin web interface. The diagram in FIG. 8 shows the different components of the web application, which are built using a web CMS that supports page templates and renders them through a page rendering engine.

Code amendments are applied to the Database Interface Connection Manager (DBI), the page rendering engine, and the shopping cart checkout script. The DBI encapsulates all the database operations and MySQL profiling is enabled within the DBI to collect MySQL usage indicators with respect to CPU, Memory, and I/O. The PHP getrusage command is used in the page rendering engine to collect CPU usage of web transaction executions. The data bandwidth is calculated through measuring the size of the HTTP reply data stream. Finally, metering indicators as well as the corresponding logged in user information are encapsulated in a white-space delimited string and posted to the metering plugin web server through the PHP/CURL library.

An XML/XSL engine is built to invoke the web application billing transactions storage engine from within the shopping cart checkout form. The list of web transactions, together with their usage and billing details, is presented to the user and the cost of the computing resources used in the shopping transaction is added to the total shopping cart bill. A generic discovery service and console are developed using standard web technologies, mainly XSL and AJAX. The discovery service is capable of parsing CMML records and discovering the embedded relation between different usage metering records without prior knowledge of the metered resources. The console is designed to present metering data at different abstraction levels, which acts as a demonstration example of the extensible and shareable nature of the CMML representation.

Summary—Cloud Metering

In this document, a unified cloud metering framework is presented. An extensible data representation is demonstrated through an object oriented extensible Cloud Metering Markup Language (CMML). Autonomous Cloud Metering Objects are realized through the distributed object oriented capabilities, as well as the receptors extensions of CMML. Mobility is achieved through the service state migration that allows CMOs to navigate through across the framework different engines. Data and time correlation are supported by the correlation engines through the CMO receptors and a virtual clock mechanism throughout the framework. Programmability is achieved through the generating of CMML code on the fly by the CME, which depends mainly on the extensible nature the CMML language. Shareablity is a key feature that is demonstrated through the integration with the discovery service and console based on generic standard web technologies. Multi-perspective online responsive metering results are generated through the distributed processing of data, and presented at different levels of abstraction.

The distributed proc filesystem transparently encapsulates a network transport protocol within simple filesystem I/O operation wrappers. Moreover, standard REST/HTTP web service protocols are used for communication. A multi-tier architecture is adopted which supports scalability and elasticity through distributed processing of metering data. The framework supports the definition of redundant metering resources availing the metering data infrastructure necessary to apply fault tolerance mechanisms.

Scaling Across Physical Boundaries

Figure 9:
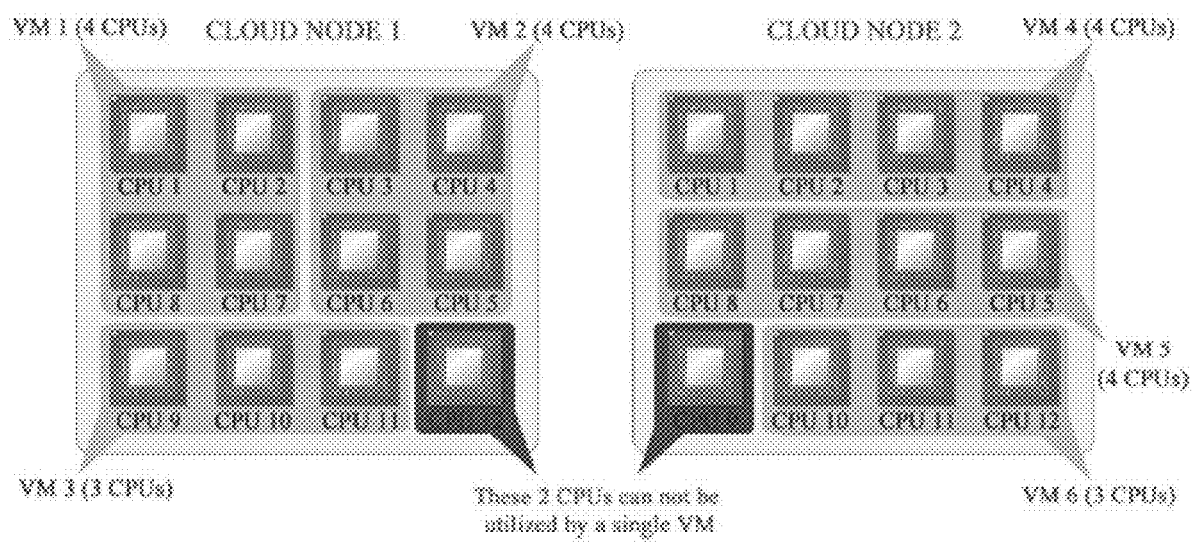
FIG. 9 is an abstract overview of the problem of de-fragmentation of cores in a cloud environment.

To build the middle and back-end tiers, one issue to be overcome is the scalability of cloud environments and the waste of the resources resulting from the physical boundaries effect of the physical nodes building the target cloud. FIG. 9 shows a simple illustration of this problem where virtual machine capacities are defined based on the needs, and which might result in wasted cores such as CPU 9 and CPU 12. If there is no need for virtual machines with one core, those CPUs are considered a waste. In some examples, a cloud metering system or other cloud computing system can provide a mechanism through which operating systems running within a hypervisor can acquire and share resources outside its physical boundaries.

Figure 10:
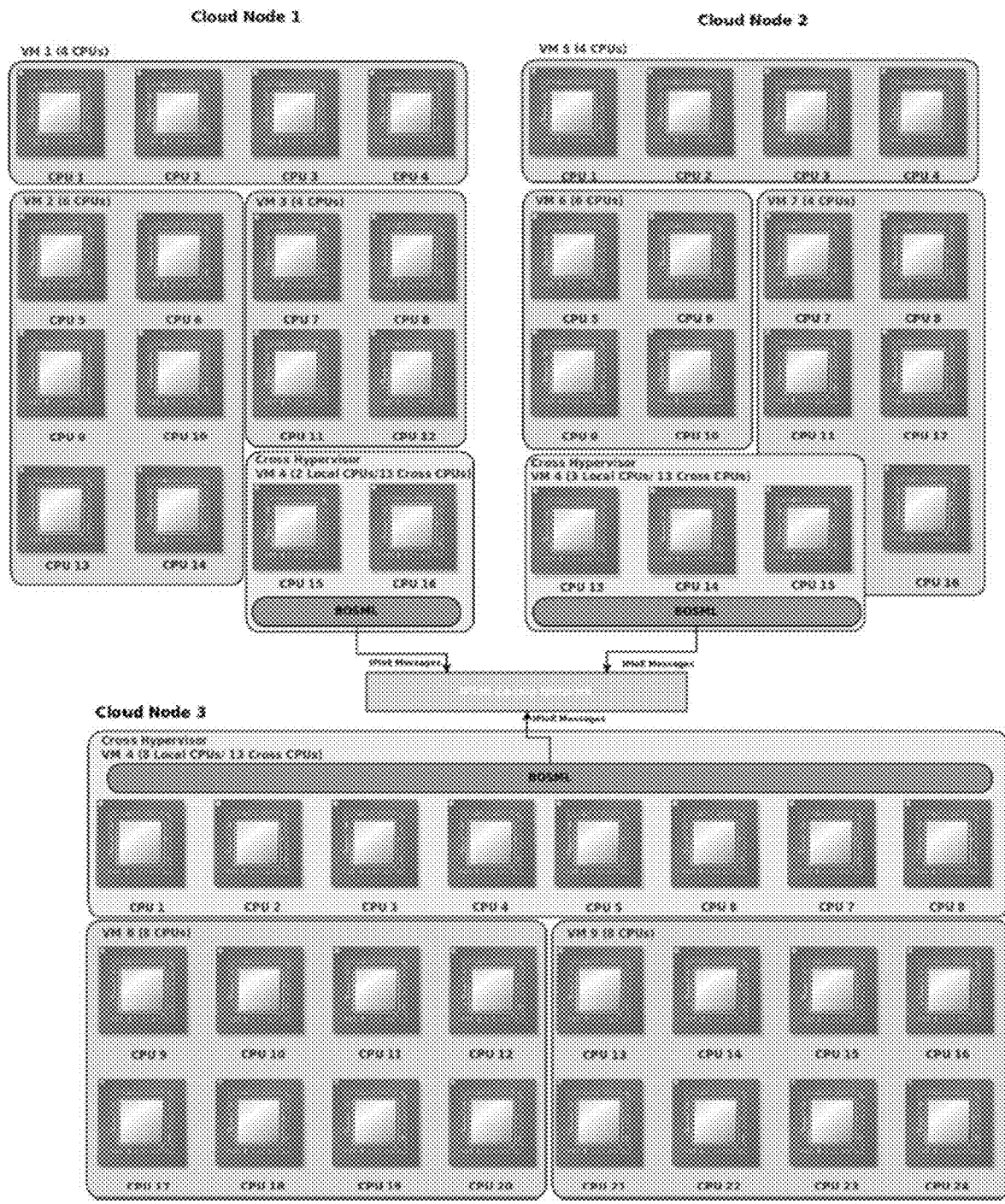
FIG. 10 is a block diagram of an example cross hypervisor and multiple cloud nodes.

FIG. 10 shows a high-level diagram of an example cross hypervisor which can build virtually a VM cross the physical boundaries of cloud nodes over network. The cross hypervisor can be built over a virtual hypervisor (built on top of physical hypervisors). The cross hypervisor is based on two building blocks, the BOSML and the IPIoE. In general, a traditional modern operating system schedule tasks in a multi-core environment by assigning tasks to different cores through a signaling mechanism that is called Inter-Processor Interrupts (IPI) which is a simple protocol that utilizes an internal bus between cores located on the same board. The tradition is that for nodes to communicate together, network messages are being sent between different nodes on the OS services level of more popularly on the middleware and application layers, where the core assignment to a task is not transparent.

In the example system, a hypervisor is started on each cloud physical node on the subset resources of the node to be consolidated into the cross hypervisor virtual machine. Each hypervisor runs an operating system that is based on BOSML that adopts service oriented architecture. The BOSML specifications supports IPIoE which allows initiating inter-processor interrupts to remote cores transparently as if it is a local processor. At any point in time, a core will be handing one or more services execution.

BOSML, which is an extended version of CMML, is a markup scripting language that is used to write services that runs on the bare metal without any intermediate dynamically linked libraries and allows all the features of service migration and portability features in addition to performance. A BOSML script can implement, for example, the HTTP protocol.

The core synchronization between the different BOSML scripts running on different physical nodes within different hypervisors is achieved through the IPIoE protocol. The IPIoE protocol is designed in a Gossip fashion that is lightweight and extensively scalable. IPIoE is based on raw Ethernet packets which withdraws all the network size limitations imposed by the IP layer, and hence theoretically no functional or architectural limitations are imposed on the number of nodes, physical of virtual, communicating through IPIoE, except for the permutation of the hardware MAC addresses range of the network cards, either physical or virtual. Performance and security are other dimensions of measures that can be evaluated in lab experiments.

Figure 11:
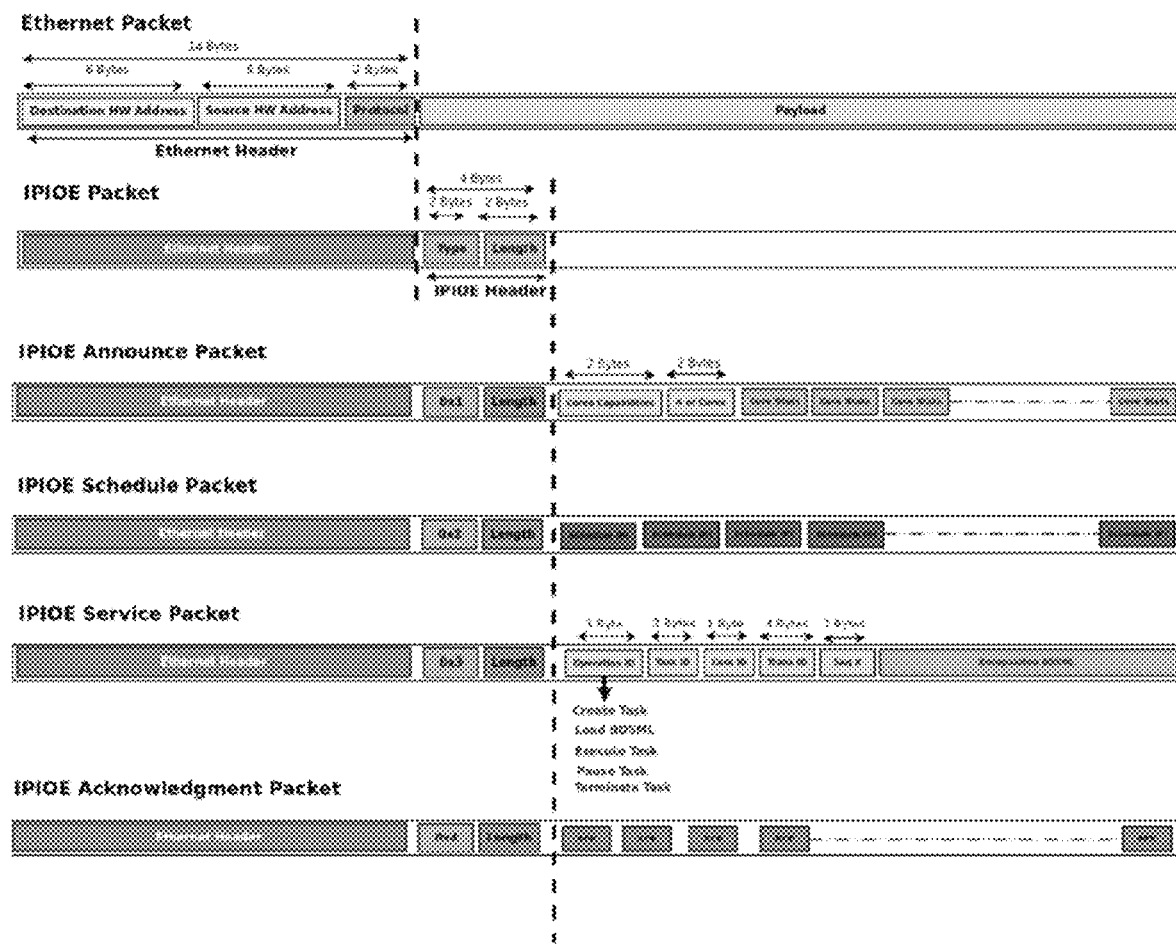
FIG. 11 is a message diagram illustrating example packets of an IPIoE protocol.
Figure 12:
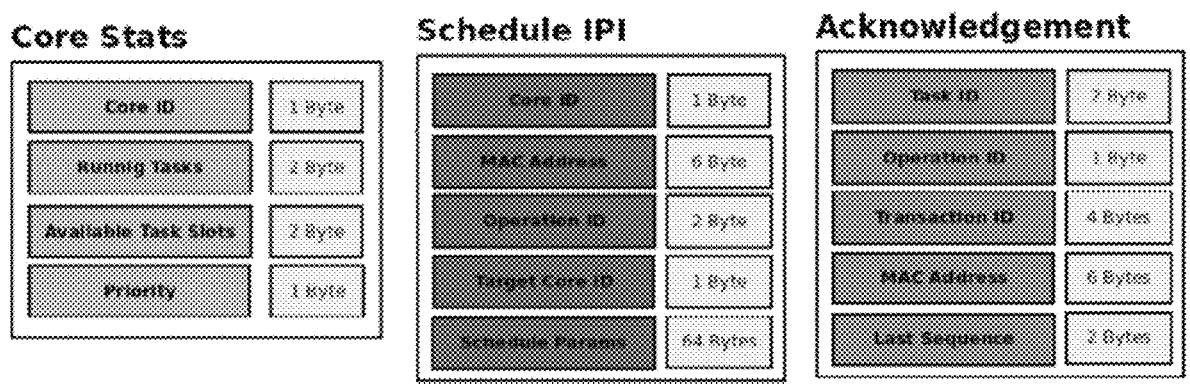
FIG. 12 is a block diagram illustrating example IPIoE data structures.

FIG. 11 illustrates the details of the IPIoE protocol with different packet types. FIG. 12 illustrates the building block structures of the different IPIoE packet types. An IPIoE packet can be a normal Ethernet packet where the IPIoE Protocol is encapsulated in the Ethernet packet payload. An IPIoE packet header is in place at the start of Ethernet payload which is composed of a type and the length of the IPIoE packet size. Consider the follow four example types of packets:

1. IPIoE Announce: An Ethernet broadcast packet that the sender used to report current status of its cores. The benefit here is that this packet is sent once on the network and is being read by all the IPIoE member.
2. IPIoE Schedule: An Ethernet broadcast packet that the sender uses to send remote IPI to cores on other nodes. The BOSML based OS should be able to translate over the network interrupts seamlessly. The sender can send multiple schedule constructs within the same packet for different cross hypervisor nodes, and the packet being a broadcast one is an architectural design decision for that purpose. Moreover, nodes that are not subject to the packet-encapsulated interrupts will still benefit from reading the packet to know what is going on in the neighborhood.
3. IPIoE Service: This packet is a destination-based packet where the sender uses to instruct a remote core to perform a service oriented instructions.
4. IPIoE Acknowledge: An Ethernet broadcast packet that contains acknowledgments of packets from different sources. The broadcast awareness of the neighborhood is still valid as in 2.

The cross-hypervisor can be thought of as a concept and is not bound by any means to the BOSML implementation. The cross-hypervisor can be based on the idea of enabling IPIs between different remote cores, and one possible implementation is the IPIoE Gossip protocol that relays IPIs between distributed cores over a network and encapsulates them within Ethernet frames. Consequently, there are at least two implementation approaches for the cross-hypervisor.

The first approach is through BOSML where a number of distributed hypervisors deploy a BOSML enabled operating system that can run BOSML services and has an IPIoE implementation in its network stack. The other approach is through extending a specific hypervisor to support IPIoE where a group of distributed hypervisors can work together as a single cross-hypervisor. For example, if the KVM hypervisor kernel module is amended with the IPIoE protocol and is configured to send remote IPIs over Ethernet frames, a cross-hypervisor can be realized and built on top of a group of KVM hypervisors transparently irrespective of their location. In both cases, a cross-hypervisor is considered a virtual hypervisor constructed over a set of distributed physical hypervisors.

Both approaches will achieve an important objective of the cross-hypervisor which is the ability to create a virtual machine that can cross the boundaries of cloud physical nodes. Yet there is a significant difference between the two approaches. In the first approach, the OS deployed on all the cross-hypervisor hypervisor members need to be running a BOSML OS, and the running applications on the cross-hypervisor will need to be written in BOSML. The contribution in this case is that hybrid hypervisors types (e.g. KVM, Virtual Box, Xen, etc.) can be combined in the same cross-hypervisor and even hardware nodes can be members in the target cross-hypervisor. On the other hand, in case of an IPIoE plug-in integrated into the hypervisor, restrictions about the types of the hypervisor used may rise up based on their support and compliance to the IPIoE protocol, yet a transparent deployment of an already existing operating system (e.g. Linux, FreeBSD, MS Windows, etc.) will be possible on top of the cross-hypervisor.

Although the IPIoE protocol is designed to build a transparent backbone framework for IPI transport over Ethernet, it can also be used for other purposes, e.g., to build a cascaded memory model through IPIoE message passing mechanisms to emulate a transparent cascaded memory apace over distributed physical memory that can be perceived by all hypervisors as one contiguous memory space. This can useful for various applications, e.g., in the second approach as the hypervisor deployed operating system will need a memory perspective that virtualizes the operating system memory irrespective of the underlying physical distributed memory topology and architecture.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
a cloud computing system comprising a plurality of processors and memory operatively connected by a data communications network for executing a plurality of cloud computing applications for providing software services, wherein the cloud computing system comprises:
a first physical cloud node comprising a first local processor core local to the first physical cloud node; and
a second physical cloud node comprising a second local processor core local to the second physical cloud node;
a cross hypervisor, implemented on the cloud computing system, configured for building a virtual machine that spans across at least one physical boundary between the first physical cloud node and the second physical cloud node over the data communications network by starting a respective hypervisor on each of the first physical cloud node and the second physical cloud node,
wherein each hypervisor is configured to execute an operating system that adopts a service oriented architecture, and wherein each hypervisor is configured to support inter-processor interrupts issued by the first local processor core and the second local processor core received from the cross hypervisor over the data communications network and across the physical boundary between the first physical cloud node and the second physical cloud node, thereby causing the first local processor core to respond to at least a first inter-processor interrupt issued by the second local processor core as a valid inter-processor interrupt even though the first inter-processor interrupt was received over the data communications network; and wherein each hypervisor is configured to adopt the service oriented architecture by virtue of a bare metal operating system markup language (BOSML) and a BOSML interpreter configured for executing one or more BOSML scripts to run on bare metal, and wherein each hypervisor is configured to support inter-processor interrupts received from the cross hypervisor using the BOSML interpreter.

2. The system of claim 1, wherein the BOSML interpreter is configured for executing the one or more BOSML scripts to run on bare metal without any dependencies to intermediate dynamically linked libraries.

3. The system of claim 1, wherein each hypervisor is configured to support inter-processor interrupts by virtue of exchanging inter-processor interrupt over Ethernet (IPIoE) protocol messages based on raw Ethernet packets.

4. The system of claim 1, wherein the cross hypervisor is configured for presenting a global view of the two physical cloud nodes as a unified resource pool.

5. The system of claim 1, wherein the cross hypervisor is implemented as a virtual hypervisor constructed over a set of distributed physical hypervisors.

6. The system of claim 5, wherein each distributed physical hypervisor is configured to execute a BOSML-enabled operating system.

7. The system of claim 6, wherein each distributed physical hypervisor is configured, by virtue of including a network stack in the BOSML-enabled operation system, to support inter-processor interrupts by virtue of exchanging Ethernet messages over the data communications network and across the physical boundary between the first physical cloud node and the second physical cloud node.

8. The system of claim 5, wherein the cross hypervisor is implemented by extending one of the distributed physical hypervisors to support inter-processor interrupts by virtue of exchanging Ethernet messages over the data communications network and across the physical boundary between the first physical cloud node and the second physical cloud node.

9. The system of claim 8, wherein extending one of the distributed physical hypervisors comprises supporting an inter-processor interrupt over Ethernet (IPIoE) protocol messages based on raw Ethernet packets.

10. A method comprising:
executing a plurality of cloud computing applications for providing software services on a cloud computing system comprising a plurality of processors and memory operatively connected by a data communications network, wherein the cloud computing system comprises:
a first physical cloud node comprising a first local processor core local to the first physical cloud node; and
a second physical cloud node comprising a second local processor core local to the second physical cloud node;
implementing, on the cloud computing system, a cross hypervisor configured for building a virtual machine that spans across at least one physical boundary between the first physical cloud node and the second physical cloud node over the data communications network by starting a respective hypervisor on each of the first physical cloud node and the second physical cloud node, wherein each hypervisor is configured to execute an operating system that adopts a service oriented architecture, and wherein each hypervisor is configured to support inter-processor interrupts issued by the first local processor core and the second local processor core received from the cross hypervisor over the data communications network and across the physical boundary between the first physical cloud node and the second physical cloud node, thereby causing the first local processor core to respond to at least a first inter-processor interrupt issued by the second local processor core as a valid inter-processor interrupt even though the first inter-processor interrupt was received over the data communications network; and wherein each hypervisor is configured to adopt the service oriented architecture by virtue of a bare metal operating system markup language (BOSML) and a BOSML interpreter configured for executing one or more BOSML scripts to run on bare metal, and wherein each hypervisor is configured to support inter-processor interrupts received from the cross hypervisor using the BOSML interpreter.

11. The method of claim 10, wherein the BOSML interpreter is configured for executing the one or more BOSML scripts to run on bare metal without any dependencies to intermediate dynamically linked libraries.

12. The method of claim 10, wherein each hypervisor is configured to support inter-processor interrupts by virtue of exchanging inter-processor interrupt over Ethernet (IPIoE) protocol messages based on raw Ethernet packets.

13. The method of claim 10, wherein the cross hypervisor is configured for presenting a global view of the two physical cloud nodes as a unified resource pool.

14. The method of claim 10, wherein the cross hypervisor is implemented as a virtual hypervisor constructed over a set of distributed physical hypervisors.

15. The method of claim 14, wherein each distributed physical hypervisor is configured to execute a BOSML-enabled operating system.

16. The method of claim 15, wherein each distributed physical hypervisor is configured, by virtue of including a network stack in the BOSML-enabled operation system, to support inter-processor interrupts by virtue of exchanging Ethernet messages over the data communications network and across the physical boundary between the first physical cloud node and the second physical cloud node.

17. The method of claim 14, wherein the cross hypervisor is implemented by extending one of the distributed physical hypervisors to support inter-processor interrupts by virtue of exchanging Ethernet messages over the data communications network and across the physical boundary between the first physical cloud node and the second physical cloud node.

18. The method of claim 17, wherein extending one of the distributed physical hypervisors comprises supporting an inter-processor interrupt over Ethernet (IPIoE) protocol messages based on raw Ethernet packets.

* * * * *

UNITED STATES PATENT AND TRADEMARK OFFICE
CERTIFICATE OF CORRECTION

PATENT NO. : 10,698,711 B2
APPLICATION NO. : 15/088476
DATED : June 30, 2020
INVENTOR(S) : Sobh et al.

It is certified that error appears in the above-identified patent and that said Letters Patent is hereby corrected as shown below:

On the Title Page

Item (54), and in the Specification Column 1, Line 2 title should read:
"CLOUD RESOURCES CONSOLIDATION THROUGH CROSS HYPERVISORS".

Item (57), ABSTRACT should read:
"A cross hypervisor includes a BareMetal Operating System Markup language (BOSML) and a gossip network protocol that encapsulates Inter-Processor Interrupts over Ethernet frames (IPIoE). BOSML provides an object oriented development model for applications that runs close to hardware, eliminating overhead while providing the simplicity of markup languages' semantics. IPIoE is an abstraction layer for allowing distributed CPU cores to exchange IPIs and appear transparently local to each other as if they are all within the boundaries of a single computing entity. BOSML messages can be superimposed on top of IPIoE for cores to exchange messages. Through cross hypervisors, fragmented distributed resources are harnessed into one hypervisor, and the ability of consolidating more than one cloud node into a single hypervisor is achieved. A cross hypervisor can be thought of as a virtual hypervisor that utilizes distributed traditional hypervisors to provide an abstraction layer for applications running within the cross hypervisor.".

Signed and Sealed this
Twenty-second Day of September, 2020

Andrei Iancu
*Director of the United States Patent and Trademark Office*